United States Patent
Horsch

(10) Patent No.: US 9,253,937 B2
(45) Date of Patent: Feb. 9, 2016

(54) TOWED AGRICULTURAL MACHINE WITH PACKER UNIT AND METHOD FOR OPERATING SUCH A MACHINE

(75) Inventor: Michael Horsch, Schwandorf (DE)

(73) Assignee: Horsch Maschinen GmbH, Schwandorf (DE)

( * ) Notice: Subject to any disclaimer, the term of this patent is extended or adjusted under 35 U.S.C. 154(b) by 0 days.

(21) Appl. No.: 14/236,291

(22) PCT Filed: Aug. 28, 2012

(86) PCT No.: PCT/EP2012/066671
§ 371 (c)(1),
(2), (4) Date: Mar. 19, 2014

(87) PCT Pub. No.: WO2013/030183
PCT Pub. Date: Mar. 7, 2013

(65) Prior Publication Data
US 2014/0190711 A1    Jul. 10, 2014

(30) Foreign Application Priority Data

Aug. 30, 2011    (EP) .................................... 11179295

(51) Int. Cl.
*A01B 63/24* (2006.01)
*A01B 49/02* (2006.01)
(Continued)

(52) U.S. Cl.
CPC ............. *A01B 63/24* (2013.01); *A01B 49/027* (2013.01); *A01B 63/16* (2013.01); *A01B 73/00* (2013.01); *A01B 73/048* (2013.01)

(58) Field of Classification Search
CPC ........ A01B 73/00; A01B 73/02; A01B 73/04; A01B 73/042; A01B 63/16; A01B 63/22; A01B 63/24; A01B 49/027

USPC .................................. 172/395, 397, 407, 413
See application file for complete search history.

(56) References Cited

U.S. PATENT DOCUMENTS 4,479,549 A * 10/1984 Fegley ........................... 172/142
4,519,460 A * 5/1985 Gust ............................... 172/176
(Continued)

FOREIGN PATENT DOCUMENTS

DE         4306145        9/1994
DE         10084623       9/2005
(Continued)

OTHER PUBLICATIONS

EP11179295.8-1260—European Search Report for Application filed Aug. 30, 2011.
(Continued)

*Primary Examiner* — Robert Pezzuto
*Assistant Examiner* — Jessica H Lutz
(74) *Attorney, Agent, or Firm* — Simmons Perrine Moyer Bergman PLC

(57) ABSTRACT

A towed agricultural machine for tillage purposes and/or for sowing seeds is disclosed. The machine comprises a running gear, tillage tools, and a packer unit, the latter being coupled to the running gear and forming a constructional and/or functional unit therewith. In a first operating position, the running gear is in an active position for road traffic and the packer tools are brought outside the engagement range with the ground. In a second operating position, the running gear, or at least parts thereof, are in an inactive position out of contact range with the ground, while the packer tools are in an active mode in engagement with the ground.

11 Claims, 15 Drawing Sheets

(51) Int. Cl.
*A01B 73/00* (2006.01)
*A01B 73/04* (2006.01)
*A01B 63/16* (2006.01)

(56) References Cited

U.S. PATENT DOCUMENTS

| | | | |
|---|---|---|---|
| 4,534,416 A * | 8/1985 | Johnson | 172/311 |
| 4,871,030 A | 10/1989 | Kruse | |
| 4,896,732 A * | 1/1990 | Stark | 172/311 |
| 5,052,495 A * | 10/1991 | McFarlane et al. | 172/140 |
| 5,357,884 A * | 10/1994 | Bourgault | 111/186 |
| 6,119,792 A * | 9/2000 | Almer | 172/799.5 |
| 6,408,950 B1 * | 6/2002 | Shoup | 172/311 |
| 6,443,079 B1 * | 9/2002 | Horsch | 111/52 |
| 6,550,543 B1 * | 4/2003 | Friggstad | 172/311 |
| 6,902,010 B2 * | 6/2005 | Shoup | 172/456 |
| 7,481,278 B1 * | 1/2009 | Pomedli et al. | 172/1 |
| 7,997,217 B2 * | 8/2011 | Stark et al. | 111/52 |
| 8,567,517 B2 * | 10/2013 | Friggstad et al. | 172/140 |
| 2013/0199807 A1 * | 8/2013 | Hoffman et al. | 172/1 |

FOREIGN PATENT DOCUMENTS

| | | |
|---|---|---|
| FR | 2912867 | 8/2008 |
| FR | 2946831 | 12/2010 |
| GB | 2246938 | 2/1992 |
| WO | WO9103922 | 4/1991 |
| WO | WO9740660 | 11/1997 |

OTHER PUBLICATIONS

PCT/EP2012/066671—ISR Search Report for Application filed Aug. 28, 2012.

PCT/EP2012/066671—Mar. 4, 2014 International Preliminary Report on Patentability—English Translation.

* cited by examiner

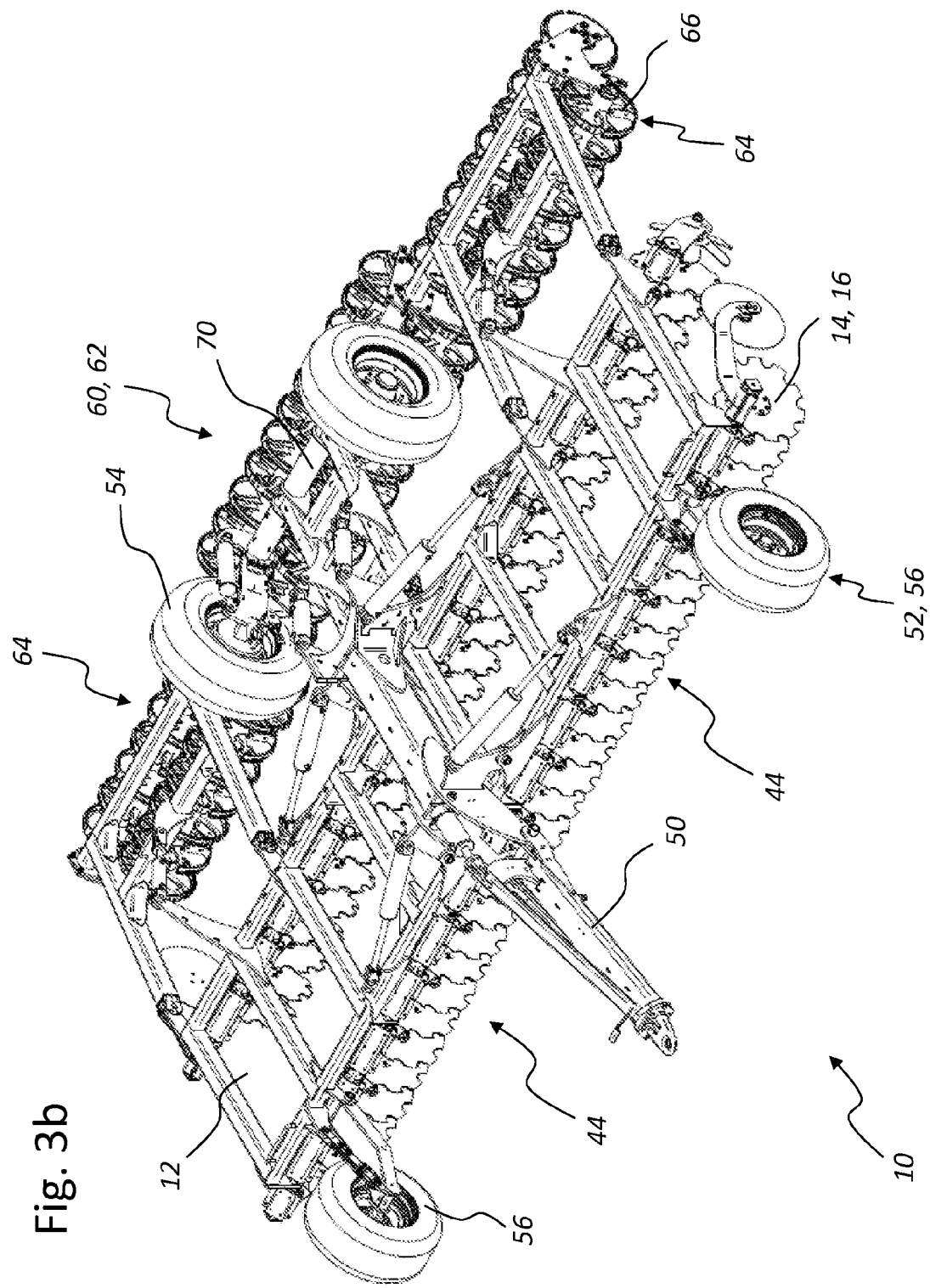

TOWED AGRICULTURAL MACHINE WITH PACKER UNIT AND METHOD FOR OPERATING SUCH A MACHINE

CLAIM OF PRIORITY

The present application is a national stage application under §371 of PCT/EP2012/066671, filed on Aug. 28, 2012, which in turn claims priority to EP11179258, filed on Aug. 30, 2011, are incorporated by reference.

FIELD OF THE INVENTION

The present invention relates to a towed agricultural machine for the purpose of tilling and/or for sowing seeds comprising a running gear, tillage tools, and a packer unit, which is coupled to the running gear and forms a constructional and/or functional unit therewith. The invention also relates to a method for handling such a towed agricultural machine, namely for converting and/or changing the function of such a towed agricultural machine, with the features of the independent method claim.

BACKGROUND

There are a wide variety of different equipment types employed in agriculture for the purpose of tilling soil. One type of a frequently used machine comprises a frame with its own running gear, suitable for covering a wide working range, which frame is towed across the field by means of a tractor. Such tillage implements may be designed, for instance, with soil loosening tools and/or cutting equipment, provided for instance in the form of so-called short disk harrows or spike tooth harrows or the like. Tillage implements of this sort may additionally be outfitted with sowing combinations and/or fertilizer spreader devices.

For transport purposes, parts of the frame may be pivoted about a horizontal longitudinal axis, for instance, in order to reduce the machine width to dimensions that comply with road traffic regulations. Such towed agricultural tillage or sowing implements with integrated soil packer elements require different types of the existing running gear variants, which are necessary for different driving purposes, such as for road traffic or, to some extent, for turning procedures in a field. Some implement types have a soil packer element, for instance, which is designed to be simultaneously used as an element of the running gear. This type of packer element is commonly provided with tires, which are equally suitable for driving in the field as well as on the road.

Insofar as the packer elements are, however, made from steel or other materials that are not suited for road traffic, it is necessary to have an additional running gear, which usually comprises a wheel axle with a lifting device to change the implement from a working position to a transport position and vice versa. Running gears and soil packers of this kind may be arranged in many different ways within the implement combination. The running gears may be disposed in the middle or at the end of the implement, in front of or behind the soil packers, for instance. The running gears and the soil packers are commonly functionally separated from each other and therefore each require their own frame components and lifting devices. These customary types of arrangement and construction require high technical input and also a relatively large amount of installation space. In the prior art, towed agricultural implements with their own separate running gears and soil packer elements are commonly constructed by lining up the different elements one after the other. By this structure and by the installation space that the running gears, or also the soil packer elements, require for vertical movement, for instance, such towed agricultural implements tend to be very long in terms of their longitudinal extension.

At the same time, the equipment that is used in agriculture is becoming perpetually larger and heavier, thus increasing the input needed for ensuring the stability of the framework structure, for instance, of such long and heavy implements. Furthermore, the longer and bulkier such implements become, the more difficult and unsteady will it be to drive them in comparison to shorter and smaller equipment. To prevent the increasing risk of such implements tilting sideways in road traffic is a challenge that has to be met.

WO 2005/015974 A2 discloses a towed agricultural tillage machine comprising a height adjustable running gear with a lifting mechanism involving rear support wheels, which can be pivoted downward from a raised rest position and into an operating position for supporting the implement in road traffic. In a separate operation, it is possible to pivot disk-shaped tillage tools together with their support frame elements upward from a lowered operating position, which is used for driving on the field, into a rest position of the tillage tools for the purpose of driving on the road with the implement. The mechanisms for pivoting the support wheels and the tillage tools can be actuated separately from each other.

U.S. Pat. No. 7,073,604 B1 discloses a towed agricultural tillage machine with a very wide working range and comprising a multitude of height adjustable front support wheels and two pairs of height adjustable rear support wheels. A support frame of the machine comprises several sections that are articulately joined to each other so that they can pivot in relation to each other to adjust to different ground profiles during driving. Arranged immediately in front of the rear support wheels are disk-shaped packer wheels extending across the entire working range of the tillage machine.

DE 199 08 241 A1 deals with a towed agricultural implement combination that has several tillage devices in the form of disk harrow elements arranged on a frame. A running gear with running wheels is mounted at the rear end of the frame on pivotal supports. The supports are pivotal about a horizontal transverse axis and hinged to a cross beam of the frame. The pivot supports can be lowered and lifted together with the support wheels by means of double acting hydraulic cylinders. In order to adjust the implement combination to a transport position, the running gear and the ground roller are first lifted before securing elements are deactivated. It is then possible to lower the pivot supports with the running wheels, thus converting the implement combination to a transport position. The process of converting the implement from a transport position with an activated running gear to a working position with a raised running gear and vice versa requires a high level of constructional input on the one hand side, while, on the other hand, the conversion between the two operational modes can still not be effected in a fully automated manner.

WO 97/40660 A discloses another towed agricultural tillage machine comprising several disk harrow elements, subsequent packer rollers, and a rear end running gear. The packer rollers and the running gear wheels arranged behind the packer rollers in the direction of driving are located together on a rear carrier, which can be pivoted by means of an adjuster cylinder about a horizontal swivel axis disposed at the rear end on the machine frame. The rear carrier is pivoted upward on compressing the double acting hydraulic cylinder located above the swivel axis, causing the wheels to lose ground contact and leaving only the packer roller supported on the field ground. On extending the cylinder, in contrast, the rear end wheels are lowered downward and thereby lift the entire machine from the ground up to the point where all tillage tools lose the tangent contact with the ground and the machine is ready for road traffic. In this machine variant, the running gear and the packer unit form a largely rigidly connected constructional unit, which can only be pivoted on a lever arm as a whole. The running gear wheels cannot be shifted in relation to the packer unit.

SUMMARY OF THE INVENTION

One aim of the present invention is to provide a towed agricultural machine having a constructional unit of a running gear and an arrangement of packers, which unit is designed in such a manner that the machine can be quickly and easily converted from the operational mode for driving on the field to the operational mode for driving on the road and vice versa. Beside that, the invention aims at providing an easy and effective way to adjust the height of the tillage tools. Not least, it is intended that the machine is designed to enable even large-sized implements to be built very compactly in order to ensure driving stability. To realize optimum stability of the framework structure with as little input and weight as possible is an additional aim of the present invention.

In order to achieve the above-mentioned objective, the present invention thus proposes an arrangement and a functional combination of a running gear for a towed agricultural machine with a packer unit or with a packer element, which functional combination is extremely compact, thereby significantly reducing the overall length of currently common arrangements. At the same time, the combination of running gear and packer element according to the invention greatly reduces the number of components with the additional, very positive effects of lower costs, a higher level of driving stability, and better overall stability with regard to mechanics and driving dynamics in the machine's working position.

The invention proposes a towed agricultural machine for tilling and/or for sowing seeds and/or for spreading other granulated or liquid material, such as fertilizers. The essential functional elements comprised by this machine are a running gear, tillage tools, and a packer unit, which is coupled to the running gear and forms a constructional and/or functional unit therewith. In addition, the machine commonly also comprises a support frame, which supports the described components or connects them to each other, and which can be linked to an agricultural towing vehicle by means of a drawbar or another suited connection means. The machine has the special feature that in a first operating position the running gear is in an active position for road traffic and the packer unit is brought outside the engagement range with the ground, and that in a second operating position the running gear or at least parts of the running gear are in an inactive position and brought out of contact range with the ground and the packer unit is in an active mode in engagement with the ground. In other words, the two functional elements of running gear and packer unit are coupled to each other or constructionally and/or functionally connected to each other in such a manner that they are shifted or activated and deactivated, respectively, between their operating positions and their stop positions, respectively, together or simultaneously, in association with being converted from driving on the field to driving on the road and vice versa.

Ideally, the running gear and the packer unit form an extremely compact, solid functional unit with a common or at least a functionally and/or constructionally connected pivot or movement axis, about which the running gear and the packer unit can be pivoted between a first operating position for road traffic and a second operating position for driving on a field. The functional elements of the packer unit and the running gear thus form a solid or rigid unit and they may, for instance, each be individually pivotally journaled on an axis, which, as the case may be, may also be a common axis, with the packer units and the running gear being journaled in such a manner that either the running gear or the packer element comes to rest on the ground by pivoting this functional unit or this module about the said axis. This module or this combined functional unit of running gear and packer unit may comprise a horizontal swivel axis, for instance, which is journaled on an implement frame and oriented transverse to the driving direction, and further cantilever arms for the running gear or the packer unit arranged on the swivel axis, wherein the functional unit of swivel axis and cantilever arms is in itself designed to be a rigid unit. The phrases relating to a horizontal swivel axis for the functional unit or to a module as employed in the present context do not imperatively imply that the axis, or a rotatable shaft, or the like, has to be physically present. The axis may also be a virtual swivel axis, about which the combined functional unit of running gear and packer unit may be movably arranged.

The first and second operating positions of the machine according to the invention are expediently each assigned lockable stop positions of the pivoting range of the swivel axis with the cantilever arms for the running gear and the packer unit arranged thereon. Defining such lockable stop positions, however, does not exclude that the running gear wheels and/or packer elements may nevertheless be designed to be height adjustable and/or to possess a resilient yield and/or damper yield. For this purpose, the functional components may each comprise suitable spring elements and/or damper elements, which are reasonably supported on the assembly frame or on the support frame of the machine. One embodiment variant of the machine according to the invention provides that the combined functional unit of running gear and packer unit is arranged to be height adjustable in relation to the tool frame of the implement.

The combined functional unit of running gear and packer unit may optionally be arranged at a rear end of the implement. It is alternatively possible to arrange the combined functional unit of running gear and packer unit in the vicinity of the rear end of the implement, with further tools being arranged in driving direction in front of and/or behind the combined functional unit of running gear and packer unit. The packer unit may also comprise different types of packer systems, such as single packers and/or double packers. Beside the combined functional unit of running gear and packer unit, the machine may additionally comprise various tool combinations, which are combined with the functional unit. Such tools may comprise, for instance, tooth-like and/or disk-like tools or also sowing units of any type. Manifold combinations of diverse elements are generally conceivable.

The combined functional unit of running gear and packer unit, which is also referred to as "module" in the present context, may be arranged approximately in the middle of the implement as well, with the running gear serving for transport purposes in the first operating position.

It should be noted here that the terms relating to the running gear, which may arranged together with the packer unit pivotally about a swivel axis, are commonly employed in the present context to refer to that part of the running gear that is arranged near the packer elements, i.e. usually near the rear support wheels. The front support wheels, which may be employed for additional support in depth adjustment, are not pivoted in the process, but can rather commonly be height adjusted independently from the rear support wheels. Thus, the phrases and terms relating to the functionally and/or constructionally coupled unit of running gear and packer unit or relating alternatively to a "module" as employed in the present context, both in the description and in the claims, are to be understood to likewise comprise a functional unit of packer unit and support wheels, which are constructionally and functionally coupled to the packer unit.

It should be further noted that the functional unit of packer and running gear, also termed as module, does not necessarily extend across the entire working range of the machine, but commonly rather extends only across the middle section of the machine. Lateral foldable frame cantilevers, which are optionally provided, comprise no swivel axes and no running gear. Because such tillage machines according to the invention typically have very wide working ranges, it is possible to additionally provide foldable cantilever sections on each of both sides of the machine frame in order to considerably increase the overall working range of the machine. The foldable cantilever sections are arranged about horizontal swivel axes and in parallel to the driving direction, and they are preferably pivoted upward for driving on the road so that the machine width can be reduced to the dimensions required for road traffic. These cantilever sections can be pivoted downward for driving on the field, thus enabling the employment of the according frame sections with the tools arranged thereon, for instance teeth, disks, and rear-end packer units. The cantilever sections require no separate support wheels. It is also possible to omit the foldable units composed of packer units and rear support wheels for these sections.

The agricultural machine is described in diverse embodiment variants and can be employed for tilling, for sowing seeds, or for other agricultural purposes, for instance for spreading fertilizer etc. The agricultural machine according to the invention comprises a machine frame with tillage tools arranged thereon, which may take the form of, for instance, disk harrows, cultivators, shredding tools, packer tools, or the like. The machine frame may generally take any form, however as a rule it comprises a ladder type frame made of steel tubes and/or profiled steel girders at the front side of which a rigid or height adjustable drawbar or another suitable coupling means is arranged for connecting the implement with an agricultural towing vehicle. Arranged at the bottom side of the rigid or partly movable and/or pivotal machine frame are the tillage tools, which may optionally be height or angle adjustable in relation to the machine frame. It is also possible to optionally dispose the tillage tools at the machine frame so that they are interchangeable and can thus be employed in varying combinations of several groups of tillage tools assembled together. The machine according to the invention furthermore comprises a packer unit, which is arranged subsequent to the tillage tools in the driving direction of the machine, and which is hinged to the machine frame to be pivotally movable and height adjustable. Assigned to this packer unit is a running gear comprising at least two rear support wheels arranged in the area of the rear end of the machine, which steering wheels are variable and adjustable together with the packer unit so that it is possible to prepare and set up the agricultural machine for driving on the field as well as for road traffic quickly and involving only a few adjustment operations.

A special feature of the packer unit, which is journaled or hinged pivotally and height adjustably to the machine frame, lies in that it comprises a pivotal or adjustable module, which is pivotally journaled between two stop positions, and which bears or comprises the running gear and/or the rear support wheels as well as the actual packer tools. This means that both the running gear and/or the rear support wheels and also the packer tools—which as a rule take the form of a multitude of rotating disks, rollers, or the like—are arranged on the above-mentioned module or functional unit. The module or the functional unit with the running gear and the packer tools can be adjusted or set between two stop positions in such a manner that either the running gear or the packer tools face toward the ground and/or are in engagement or in contact with the ground in the respective stop positions. In other words, when the running gear and/or the rear support wheels face toward the ground and touch the ground in one of the two stop positions of the module or the functional unit, the machine is supported on the wheels or on the running gear and can be moved on the road, while the packer tools are out of engagement with the road or the ground. The other stop position, in contrast, is characterized in that the packer tools face toward the ground and are in engagement with the soil, while the wheels or the running gear are in a raised position or pivoted in such a manner that they cannot touch the ground. In order to achieve this and in order to be able to set and realize the two stop positions of the module or the functional unit, there are separate adjustment devices assigned to each of both, the packer unit and the module arranged on the packer unit, which adjustment devices can be controlled independently from each other, and which adjustment devices are employed for adjusting and/or pivoting the packer unit and the module or the functional unit arranged thereon. These at least two separate and independently controllable adjustment devices may take the form of hydraulic or pneumatic cylinders, for instance, which can be controlled from the towing vehicle and charged with control pressure for applying the desired settings to the machine.

In a particularly preferred embodiment variant of the agricultural machine according to the invention, the packer unit, which is hinged or journaled onto the machine frame, comprises a pivotal and height adjustable packer frame, which is coupled to the machine frame with at least one first adjustment device. This packer frame is formed in such a manner that the at least one first adjustment device lifts or lowers the packer unit as a whole, said packer unit being hinged on the frame and movable about an approximately horizontal swivel axis. It is in this manner that the height adjustability of the machine is effected. The tillage tools are lifted or lowered by adjusting the adjustment device intended for this purpose and by lifting or lowering the packer frame of the packer unit, which feature is particularly advantageous for driving on the field with the tillage tools in engagement with the soil, as the machine frame and thus the tillage tools can be easily and quickly adjusted in height according to the employed tools and according to soil conditions and/or desired working depth. Other alternative embodiment variants of the connection comprising the machine and the height adjustable packer frame hinged to the rear end of the machine frame are conceivable, for instance a linear guiding means for height adjustment, or a suitable lever deflection, or the like.

The height adjustability of the packer unit, which is effected by means of the first adjustment device or by means of two or more first adjustment devices by lifting or lowering the packer frame, may also be an advantage for driving on the road. When the packer tools are pivoted upward and the rear end packer unit with the rear end wheels or with the running gear is lowered to touch the ground and is thus supported on the ground, the tillage tools can be positioned at an advantageous distance from the road surface. The tillage tools are thus reliably prevented from coming into contact with the ground in bad road conditions and on rough roads, which contact could otherwise result in damages to the road and/or to the tools and the implements of the machine.

Optionally, front support wheels may additionally be employed and arranged at one of the front sides of the coupling device, preferably to both sides of the drawbar. These optional front support wheels are preferably also height adjustable, with the possibility to lower them, in particular, for road traffic. As a result, this machine would be suitable for being towed and would be self-supported on a complete running gear having at least four wheels. With the front support wheels missing, such a machine is usually designed as a semi-trailer, which has to be connected to a suitable trailer device of an agricultural towing vehicle, in order for the machine to be supported in road traffic when the tillage tools may not touch the ground.

The module, which is movably arranged at the packer unit and forms a part of the packer unit, may comprise, for instance, a module frame, which is pivotally arranged at the packer frame and on which the packer tools and the running gear and/or the rear support wheels are hinged or journaled. Viewed from a side, the rear support wheels or the running gear, as the case may be, the packer tools, and the pivot journal of the module in this way form a triangle, wherein a module frame, viewed for instance from the side, may be formed like a V or fork-like, with the wheel journals or the—as a rule rotating—packer tools each arranged at the fork ends and with the tip of the V's outline forming the means for journaling the module frame at the packer frame, which journal is adjustable and pivotal in relation to the packer frame about a horizontal swivel axis. In this arrangement, the module is pivotally arranged at the packer frame and a pivoting movement around an approximately horizontally positioned swivel axis defines the stop positions of the module. These stop positions are additionally controllable by means of adjustment movements of at least one second adjustment device hinged onto the packer frame. This second adjustment device swivels the module or, as the case may be, the module frame between its two stop positions. As the packer tools and the wheels or, as the case may be, the running gear are located at opposite sides of the frame or at least spaced considerably apart from each other, the desired conversion between the modes for driving on the field and driving on the road can be effected by this pivoting movement.

In the manner described above, it is possible for the running gear and/or the rear-end support wheels to be brought into an active position for driving on the road in a first operating position, while the packer unit is brought outside the engagement range with the ground. Similarly, it is possible that the running gear, or at least parts thereof, are brought into an inactive position out of contact range with the ground in a second operating position, while the packer unit is in an active mode in engagement with the ground. The height adjustability of the machine and/or of the tillage tools is effected by pivoting the packer frame, together with the functional unit of packer unit and running gear and/or rear support wheels arranged on said packer frame, around the first horizontal transverse axis, and it is further effected by means of a conversion between the first operating position for driving on the road and the second operating position for driving on the field, said conversion resulting from pivoting the functional unit of packer unit and running gear and/or rear support wheels arranged at the rear end of the packer frame around a second horizontal transverse axis.

The present invention furthermore comprises a method for the conversion and/or functional change of the towed agricultural machine as described in various embodiment variants above. The machine can be converted or the function of the machine can be changed between a first operating mode for tilling and/or for sowing seeds and a second operating mode for road traffic by means of the method as described in the following passages. As mentioned above, the machine comprises a machine frame and tillage tools arranged thereon and further a packer unit arranged subsequent to the tillage tools in the driving direction of the machine, the packer unit being hinged pivotally and height adjustably on the machine frame. Assigned to this packer unit is a running gear comprising at least two rear support wheels, which are arranged in the area of the rear end of the machine. Furthermore, the packer unit is pivotally and height adjustably journaled on the machine frame and comprises a module with a running gear and/or rear support wheels as well as packer tools arranged thereon, which module is journaled to be pivotal between two stop positions. In the respective stop positions, either the running gear or the packer tools face toward the ground and/or are in engagement or in contact with the ground. By means of a first adjustment device, it is possible to adjust the height and the angle of the packer unit, together with the module journaled thereon, in relation to the machine frame. By means of a second adjustment device, it is possible to pivot or switch the module between its two stop positions for driving on the road and for driving on the field.

For employing the method according to the invention, the at least one first adjustment device can lower or lift the packer unit as a whole, said packer unit being hinged on the frame and movable around an approximately horizontal swivel axis. In addition, an adjustment or a pivoting movement of the module arranged pivotally on the packer frame around an approximately horizontally positioned swivel axis defines the stop positions of said module, wherein these stop positions are controllable by means of adjustment movements of the second adjustment device that is hinged onto the packer frame. The second adjustment device swivels or revolves the module between its two stop positions, so that the running gear may also be termed a revolving running gear. The packer tools and wheels are preferably located at opposite sides of the frame or at least spaced considerably apart from each other in order to enable pivoting the module frame between its stop positions and thus effecting the respectively required operating mode for the machine according to the invention.

In a first operating position, the running gear and/or the rear end support wheels are brought into an active position for driving on the road, while the packer unit is brought outside the engagement range with the ground. In a second operating position, the running gear, or at least parts thereof, are brought into an inactive position out of contact range with the ground, while the packer unit is in an active mode in engagement with the ground.

BRIEF DESCRIPTION OF THE DRAWINGS

In the following passages, the attached figures further illustrate exemplary embodiments of the invention and their advantages. Other characteristics, aims, and advantages of the present invention will become apparent from the following detailed description of an embodiment variant according to the invention, given by way of a nonlimiting example and with reference to the appended drawings.

FIGS. 3a and 3b show two further schematic views of the towed agricultural tilling machine according to FIG. 1, in which the module frame is pivoted from the first operating position in the direction of the second operating position by a larger pivot angle.

DETAILED DESCRIPTION

Figure 1A:
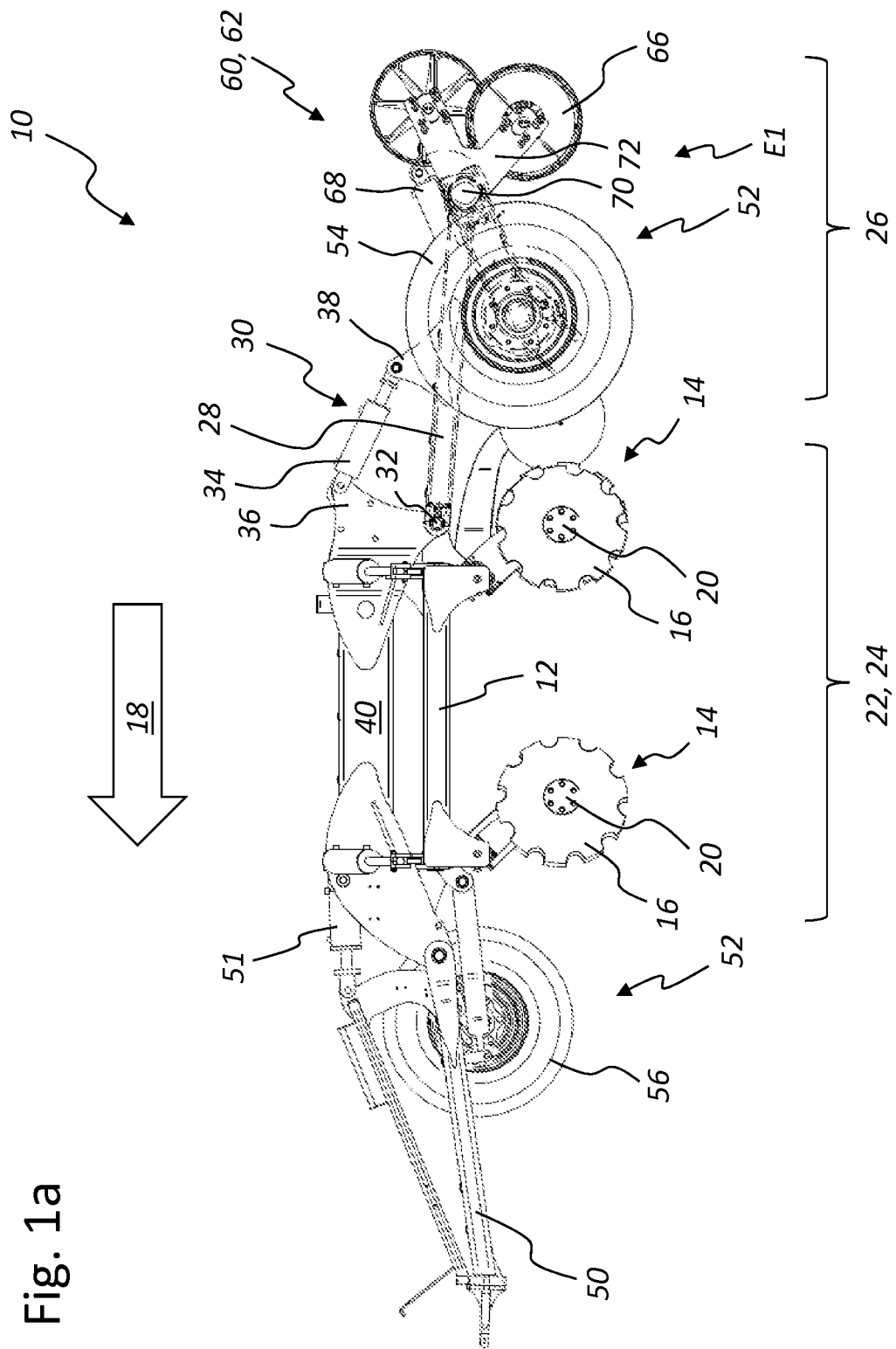
FIGS. 1a, 1b, 1c, and 1d show four different schematic views of an embodiment variant of a towed agricultural tilling machine with a running gear in a first operating position for road traffic.

The same or equivalent elements of the invention are each designated by identical reference characters in the FIGS. 1a to 5d. Furthermore and for the sake of clarity, only the reference characters relevant for describing the respective figure are usually provided. It should be understood that the detailed description and specific examples of the machine according to the invention, while indicating preferred embodiments, are intended for purposes of illustration only and are not intended to limit the scope of the invention.

The four schematic drawings in FIG. 1 illustrate the structure and the general manner of functioning of an exemplary embodiment variant of a towed agricultural implement or a towed agricultural machine 10 according to the invention. The schematic lateral view in FIG. 1a gives the essential components of the towed agricultural machine 10, which is intended for the purpose of tilling, but also for sowing seeds or spreading fertilizer using sowing units, which are not shown here, and which may be constructionally combined with the machine 10 or coupled to the machine for towing, for instance. The machine 10 has a machine frame 12 and tillage tools 14 arranged thereon, which may take the form of a multitude of disks 16, for instance, as is illustrated in the schematic perspective view in FIG. 1c. The disks 16, which are each arranged transverse to the direction of driving 18 of the machine 10, are each revolvable about a common axis 20 or about several axes 20, so that a middle section 22 of the machine 10 forms the actual working range 24 (cf FIG. 1a), which in this instance takes the form of a disk harrow with two consecutive transverse rows of disks 16, which are profiled or serrated along their outer perimeter. This working range 24 of the machine 10 that takes the form of a disk harrow may, in particular, serve for stubble cultivation, for instance for plowless tillage.

Arranged subsequent in driving direction 18 to the middle section 22 of the machine 10 with the working range 24 is a packer unit 26, which is hinged pivotally and height adjustably on the machine frame 12. The packer unit 26 is thus arranged in driving direction 18 at the rear end of the machine 10 so that the packer units 26 with the rotating packer tools 66 follow the disk harrow (tillage range 24). As can be clearly seen in the FIGS. 1a and 1b, the packer unit 26, which is hinged at the rear end on the machine frame 12, comprises a pivotal and height adjustable packer frame 28, which is coupled to the machine frame 12 with a first adjustment device 30. The illustrations in FIG. 1, and in particular in FIG. 1d, clearly show that the packer frame 28 is pivotally hinged in a mounting means 32 on the machine frame 12 so that the first adjustment device 30 can lower or lift the packer unit 26 as a whole, said packer unit 26 being hinged on the frame 12 and movable around an approximately horizontal swivel axis. For this purpose, the first adjustment means 30 in the illustrated exemplary embodiment variant is formed by two parallel and jointly controllable hydraulic cylinders 34, which are attached in a slightly inclined mounting position between a frame side linkage 36 at the machine frame 12 and a further, top side linkage 38 on the top sides of the frame columns of the packer frame 28 (cf FIG. 1d) in such a manner that the linear piston movements for compressing or extending each of the cylinders 34 may cause the packer frame 28 of the packer unit 26 to be lifted or lowered by a pivoting movement around the mounting means 32.

Figure 1B:
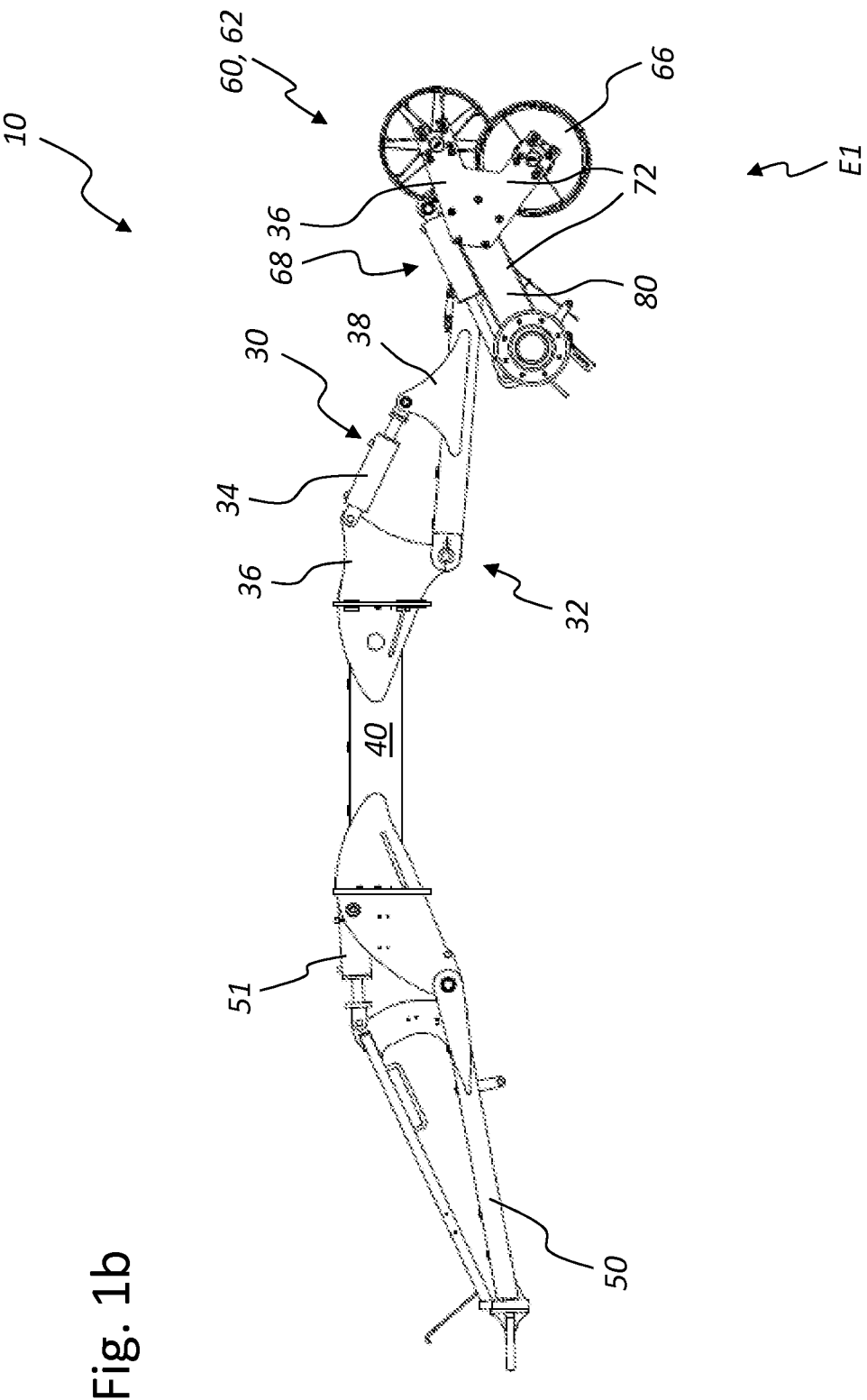
Figure 1C:
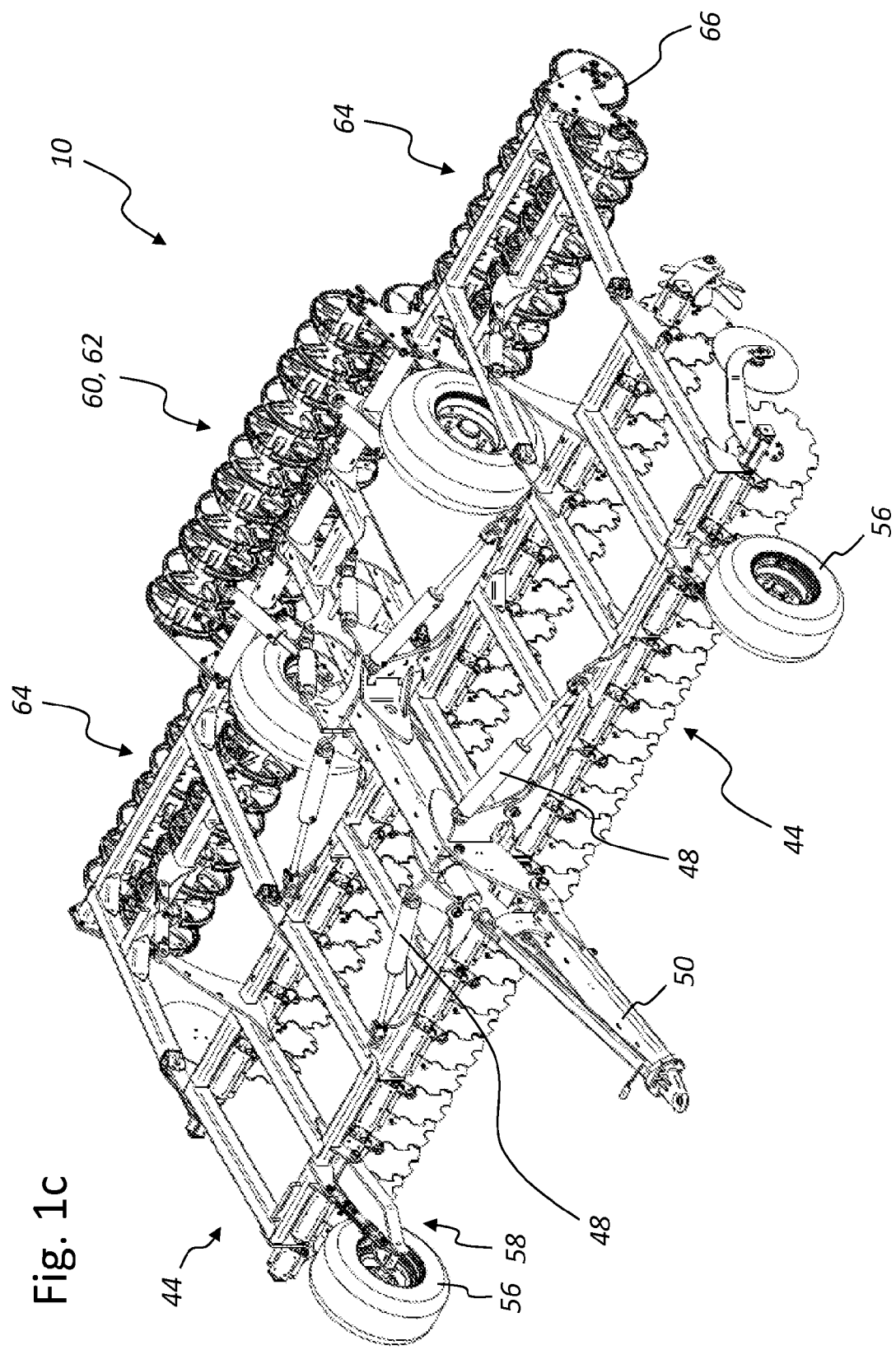
Figure 1D:
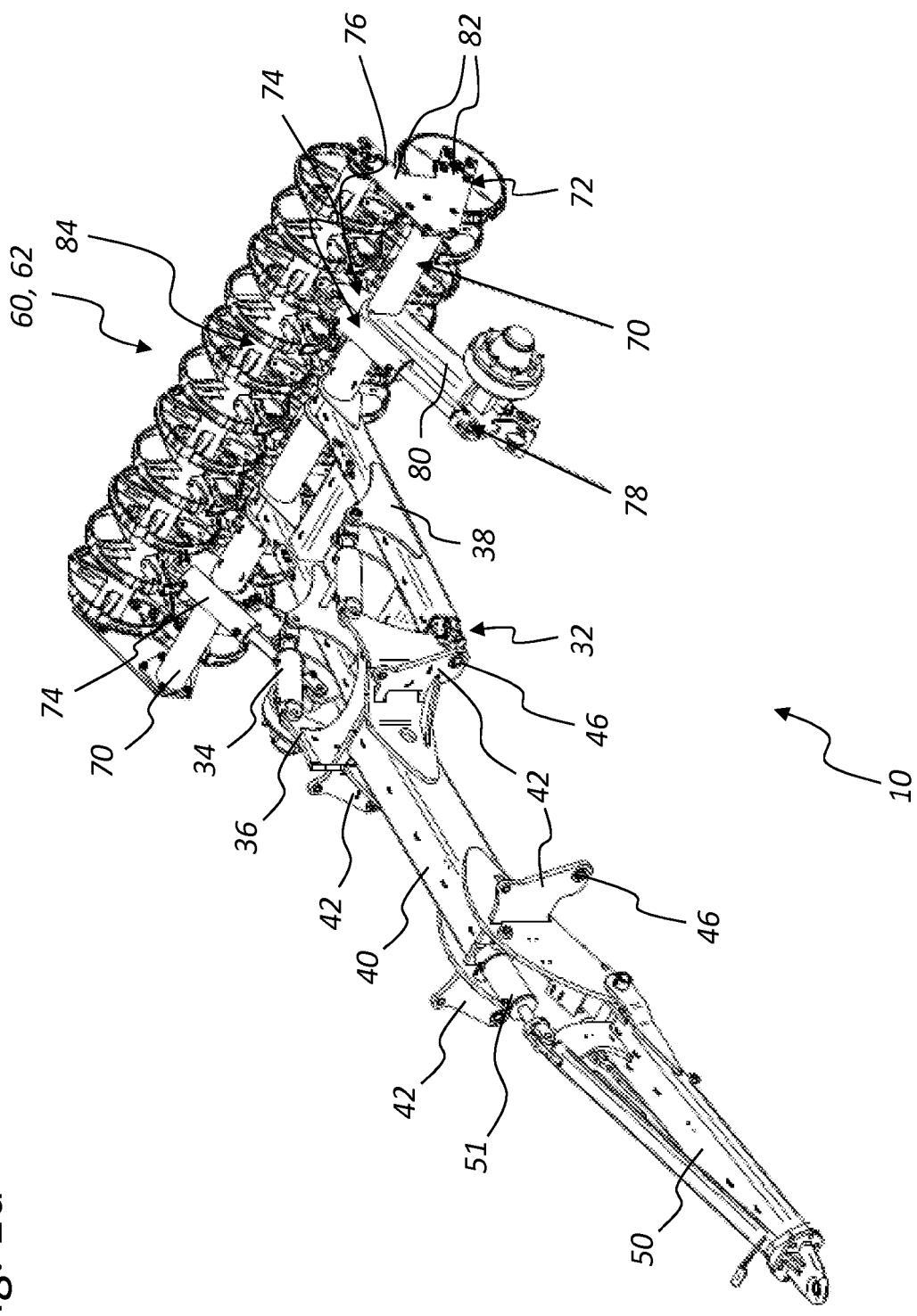

As is particularly illustrated by the two drawings in FIG. 1b and FIG. 1d, which both show only a part of the machine 10, the machine frame 12 essentially comprises a horizontally arranged, central, square frame tube 40, onto which all other parts of the machine 10 are mounted. The mounting means 32 for the packer frame 28 of the packer unit 26, which packer frame 28 is pivotal about the horizontal transverse axis, and the frame side linkage 36 for the first adjustment device 30 with the two parallel hydraulic cylinders 34 are arranged at the face side of the machine's 10 rear end in relation to the driving direction 18.

As is also illustrated by the FIGS. 1a to 1d, there are further vertically oriented mounting plates 42 arranged at each of the two longitudinal sides of the central square frame tube 40 of the machine frame 12, with the mounting plates 42 being spaced apart from each other at a distance corresponding approximately to the length of the central tube 40. The two mounting plates 42 are symmetrically arranged pairwise along the longitudinal extension direction of the machine 10 and they serve for the pivotal connection and the movability of the frame wings 44, which are pivotal upward around horizontal swivel axes positioned in parallel to the driving direction 18, with the tillage tools 14 being journaled on these frame wings 44. Since the machine 10 clearly exceeds the width that is suitable for road traffic, the two frame wings 44 are accordingly pivoted vertically upward, as shown in FIG. 5, when the machine 10 has to drive on the road. The pivoting movement of the two symmetrically arranged frame wings 44 around the horizontal swivel axes, which extend through the lower mounting holes 46 of the mounting plates 42, is effected by means of the four transversely positioned adjuster cylinders 48 (cf FIG. 1c). This pivoting movement is described in more detail by means of the schematic illustrations in FIG. 5.

A drawbar 50 is located at the face side of the frame tube 40 of the machine frame 12, which drawbar 50 is used for connecting the towed agricultural machine 10 to an agricultural towing vehicle, for instance a tractor, which is however not illustrated here. The drawbar 50 is movably hinged to the frame 12 so that it is aligned in the longitudinal extension direction of the machine 10 and so that it may be lifted and lowered around a horizontally disposed swivel axis being transversely positioned in relation to the driving direction 18, which lifting and lowering movement can be controlled by means of a drawbar cylinder 51, which drawbar cylinder 51 is horizontally positioned in parallel to the driving direction 18 and to the longitudinal axis of the machine 10 and by means of which drawbar cylinder 51 it is possible to lift and lower the machine frame 12 in relation to the drawbar 50. These lowering and lifting procedures are reasonably carried out in coordination with the rear end first adjustment device 30 for the packer unit 26 so that it is possible to adjust the working depth of the machine 10 and the tillage tools 14.

Furthermore, the machine 10 is assigned a running gear 52 with a number of support wheels and comprising at least two rear support wheels 54 arranged in a rear end area of the machine 10, with the rear support wheels 54 forming a part of the packer unit 26 and being mounted to the packer frame 28. The machine 10 furthermore and optionally comprises two front support wheels 56, which do not, however, form a part of the road running gear, as they are only suited for adjusting the height of the machine 10 while driving on a field. As is discernible from FIG. 1c, the front support wheels 56 are arranged relatively close to the outer ends of the two upwardly pivotal frame wings 44 and they each comprise a height adjustment means 58, which enables adjusting the height of the frame 12 as necessary in relation to the ground or to the working depth of the tillage tools 14. Since the tillage implement 10 is towed by a towing machine, which is not illustrated here, the running gear 52 with the front support wheels 56 and the rear support wheels 54 is designed to be height adjustable. The front support wheels 56 interact with the rear packer unit 26 to enable depth control while driving in the field and for this purpose, the support wheels 56 are designed to be mechanically or hydraulically height adjustable by means of the height adjustment 58, whereas the rear support wheels 54 of the running gear 52 serve to raise the entire implement 10 for driving on the road (cf FIG. 5) or to lower it for driving on the field (cf FIG. 4), with the machine 10 being supported at the rear end on the packer unit 26.

As the packer frame 28 is adjustable in relation to the machine frame 12, the rear wheels 54 of the running gear 52 are also height adjustable so that the rear wheels 54 support the tillage implement 10 at least during road traffic while maintaining an adequate distance between the disks 16 and the road surface. For driving on the field, it is possible to lift and pivot upward at least the rear support wheels 54, in the manner as described in the following, so that the desired tillage depth can be achieved by accordingly inserting the discs 16 of the tillage tools 14 into the soil. By lifting or lowering the packer frame 28 in relation to the machine frame 12, the first adjustment means 30 furthermore serves for depth adjustment. The rear support wheels 54 thus constitute the actual running gear 52, which is indispensable for driving on the road. The front support wheels 56 may, by contrast, be dispensed with, because the tillage implement 10 may principally take the form of a semi-trailer, which is supported by the drawbar 50 on the towing vehicle.

Another important structural element of the agricultural machine 10 according to the invention is furthermore the module 60 assigned to the packer unit 26, which couples a middle packer segment 62 of the machine to the rear support wheels 54. When the two frame wings 44 are pivoted downward onto the field for tillage purposes, there are outer packer segments 64 arranged on both sides of the middle packer segment 62 and in alignment or in approximate alignment with the middle packer segment 62, as can be seen in FIG. 1c. Each of the total of three packer segments 62 and 64 comprises a multitude of packer rollers, packer wheels, or packer tools 66, which are arranged pairwise one after the other in two parallel rows in the driving direction 18 of the machine 10 and offset against each other in such a manner that the outer perimeters of the offset, consecutive packer rollers 66 partly interlock with each other. The module 60 is pivotally journaled at the rear ends of the packer frame 28 so that it can be pivoted between two stop positions in relation to the packer unit 26 and the packer frame 28. The module 60 bears the rear support wheels 54 of the running gear 52 as well as the middle packer segment 62 of the packer unit 26 together with the packer tools 66 or the packer rollers, as the case may be. By being designed to be pivotal, it is intended for the module 60 that either the rear support wheels 54 of the running gear 52 (cf FIG. 1a) or the packer tools 66 face the ground (cf. FIG. 4a) and/or are in engagement or in contact with the ground in the respective stop positions. In order to achieve such adjustability between its two stop positions, the module 60 is assigned a second adjustment device 68 to enable adjusting the module 60 independently from the height adjustment of the packer unit 26, which is adjusted in height by means of the first adjustment device 30.

As can be seen in particular in the perspective and partially disassembled view in FIG. 1d, a rotatably journaled cross tube 70 is arranged in a horizontal and transverse position in relation to the driving direction 18 of the machine 10 at the rear end of the packer frame 28 that is averted from the mounting means 32, which cross tube 70 bears a pivotal module frame 72, onto which the packer tools 66 and the rear part of the running gear 52 or, as the case may be, the rear support wheels 54 are mounted or journaled. As can be further seen in FIG. 1b, the module frame 72 forms a connection, which is in itself rigid, between the middle packer segment 62 and the rear support wheels 54 together with their mounting, which is pivotal by means of the cross tube 70 and the second adjustment means 68 about the central axis of the cross tube 70. The stop positions of the module 60, which is pivotally arranged on the packer frame 28, are therefore defined by a pivoting movement about the horizontally positioned swivel axis, which coincides with the cross tube 70, with these stop positions being controllable by adjustment movements of the second adjustment device 68, which is hinged on the packer frame 28. The swivel axis may take the form of two tubes telescoped into each other, as is illustrated here. Other embodiment variants are also conceivable, however, for instance variants comprising a mounting link with a shaft journaled to it and arranged outside of the tube as such. Generally it is also possible to employ other construction types than the variant illustrated here with coaxial tubes that revolve against each other. The revolving movement or the guidance may be performed in other ways as well, for instance in a manner similar to the linkage points of the outer wings.

In the exemplary embodiment variant shown here, the second adjustment device 68 is formed by a pair of hydraulic cylinders 74, which in turn are each attached to a cantilever 76 mounted on the packer frame 28 on one side, and to a linkage 78 assigned to the wheel side of the module frame 72 on the other side, so that the module frame 72 may be pivoted between its stop positions by an extending or compressing movement of the hydraulic cylinders 74 of the module 60.

In a first operating position of the machine 10 according to the FIG. 1a, the pivotal module 60 is in its first stop position E1 and the machine 10 is ready and suited for road traffic. According to FIG. 1b, the hydraulic cylinders 74 of the second adjustment device 68 are extended for this purpose, the rear support wheels 54 are lowered and the module frame 72 pivoted in such a manner that the packer tools 66 of the middle packer segments 62 are pivoted to the back by approximately 90 degrees and thus lifted from the ground (cf FIG. 1c and the illustration in FIG. 5d, as well).

Figure 4A:
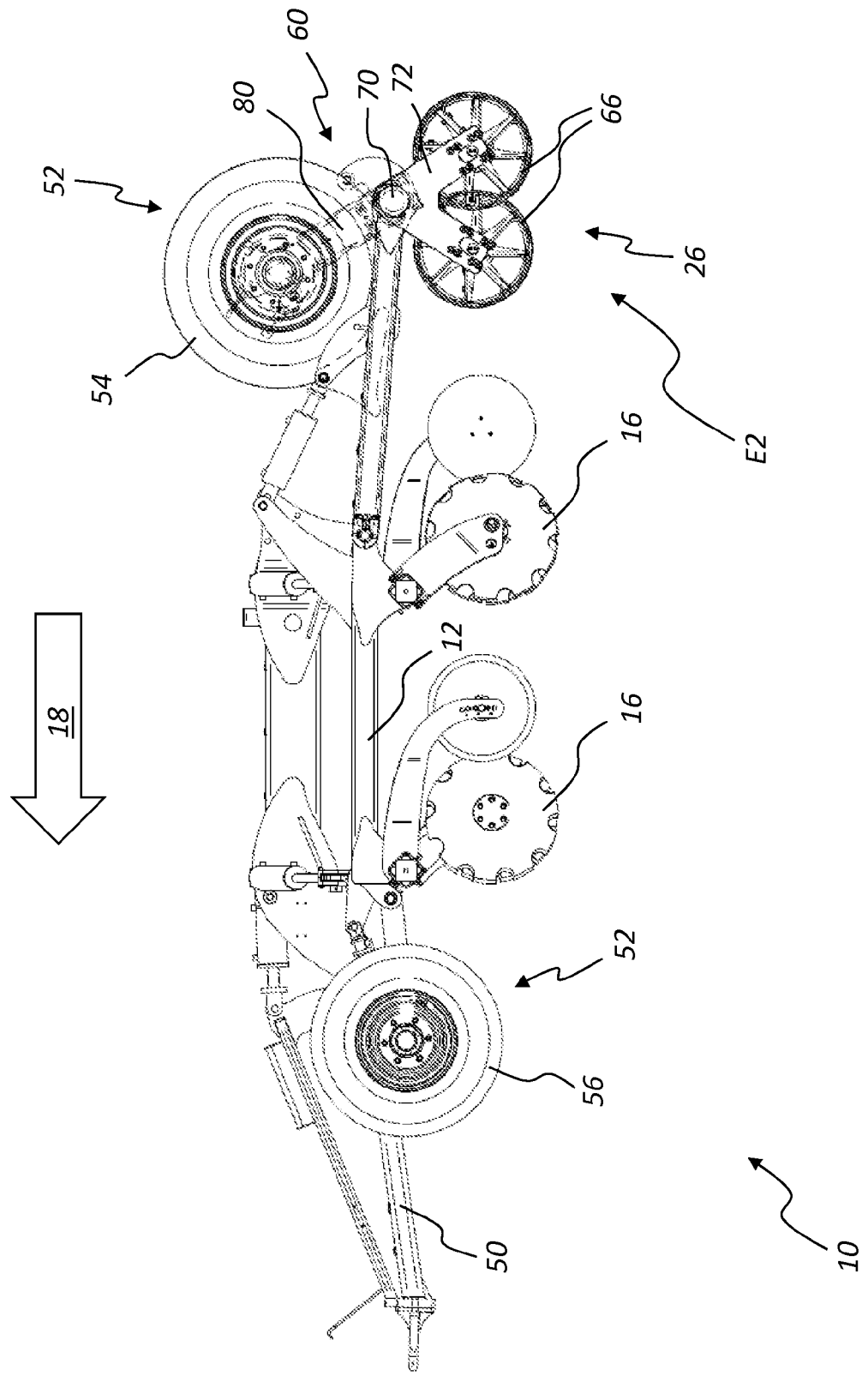
FIGS. 4a, 4b, and 4c show three schematic views of the towed agricultural tilling machine according to FIG. 1 wherein the packer tools are resting on the ground and the module frame is in a second operating position for driving on the field.

In a second operating position of the machine 10 (according to FIG. 4), the pivotal module 60 is, by contrast, in its second stop position E2 and the machine 10 is ready for driving on the field, as can be seen in FIG. 4a. The rear support wheels 54 of the running gear 52 are lifted in this position, which is achieved by compressing the hydraulic cylinders 74 of the second adjustment device 68. The adjustment or pivot angle between the two stop positions E1 and E2 of the module frame 72 is approximately 90 degrees, with the result that the wheels 54 are pivoted upward in the second stop position E2 (cf the FIGS. 4a, 4b, and 4c), while the two rows of packer tools 66 of the middle packer segment 62 are fully supported on the ground.

The module 60 thus forms a combined functional unit of the rear part of the running gear 52 and the packer unit 26. For this purpose, the module frame 72 of the pivotal module 60 comprises the cantilever arms 80 and 82 for the running gear 52 and for the packer tools 66, respectively, wherein the constructional unit formed of module frame 72 and cantilever arms 80, 82, is designed to be in itself rigid (cf. FIG. 1b). While the first cantilever arms 80 bear both the linkages 78 for the hydraulic cylinders 74 of the second adjustment device 68 and the wheel carriers for the rear support wheels 54, the second cantilever arms 82 of the module frame 72 are plates, which are formed like a V or fork-like, and which are arranged at the transverse ends of the cross tube 70 and bear the two parallel packer shafts 84 of the middle packer segment 62 with the packer tools 66 arranged thereon.

The two stop positions E1 and E2 may in particular serve to define the lockable first and second operating positions, respectively, of the machine 10 by controlling the second adjustment means 68. While the FIGS. 1a to 1d illustrate the first stop position E1 with the hydraulic cylinders 74 fully extended and the module 60 with the packer tools 66 thus pivoted about the cross tube 70 toward the machine's rear end, the FIG. 2 ff. illustrate an adjustment procedure in the direction of the second stop position E2, which is achieved according to FIG. 4 by fully compressing the hydraulic cylinders 74 of the second adjustment means 68 and thus pulling upward the linkage 78 on the first cantilever arm 80 together with the rear support wheel 54 journaled thereon and simultaneously pivoting the module frame 72 downward around the cross tube 70. The module 60 is thereby revolved in such a manner that the rear support wheels 54 are raised and the two packer shafts 84 with the packer tools 66 arranged thereon are turned to face the ground and come to rest on the ground.

Figure 2A:
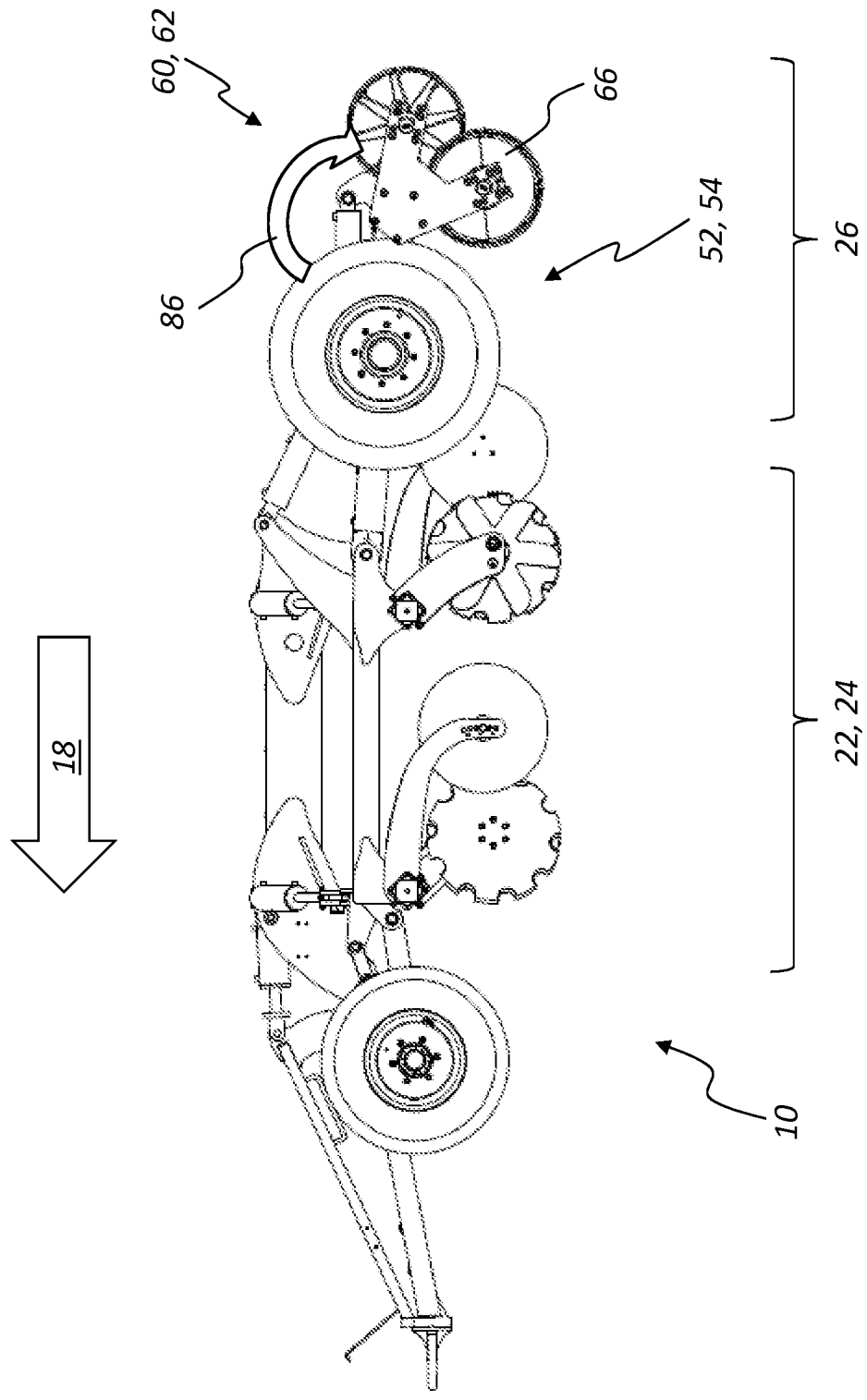
FIGS. 2a and 2b show two schematic views of the towed agricultural tilling machine according to FIG. 1 with a module frame and packer tools and further running gear wheels arranged thereon, which module frame is pivoted out of the first operating position by a slight pivot angle.
Figure 2B:
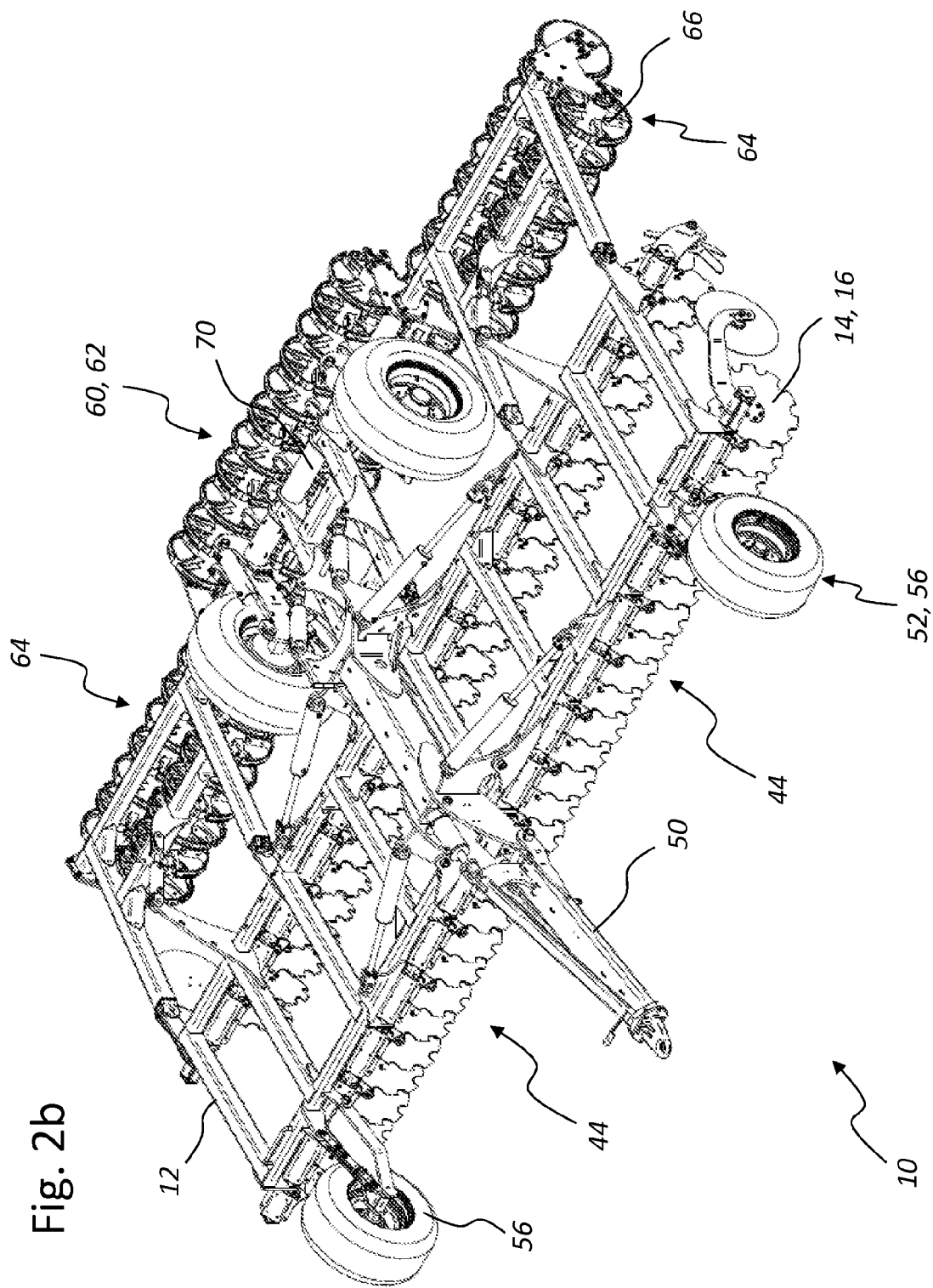

The FIGS. 2a and 2b illustrate the pivoting movement of the rear module 60 of the machine 10 about the cross tube 70, which pivoting movement is effected by compressing the two hydraulic cylinders 74 of the second adjustment device 68. In this process, the upper cantilever 76, which is fixedly anchored to the packer frame 28 and used for linking the respective hydraulic cylinder 74, remains rigid, while the lower linkage 78 turns the cantilever arm 80 of the module frame 72 (cf FIG. 1b and FIG. 1d) with the rear support wheel 54 journaled thereon upward in the direction of the arrow 86 (cf FIG. 2a). The rear support wheels 54 of the running gear 52 of the machine 10 are already lifted off the ground by a few centimeters in this illustration, while the foremost of the two packer rollers 66 is already close to the ground or touching the ground. Although the running gear 52 is already out of function, at least in the rear end of the machine 10, by the rear support wheels 54 being completely lifted off the ground, the second stop position E2 is not reached yet.

Figure 3A:
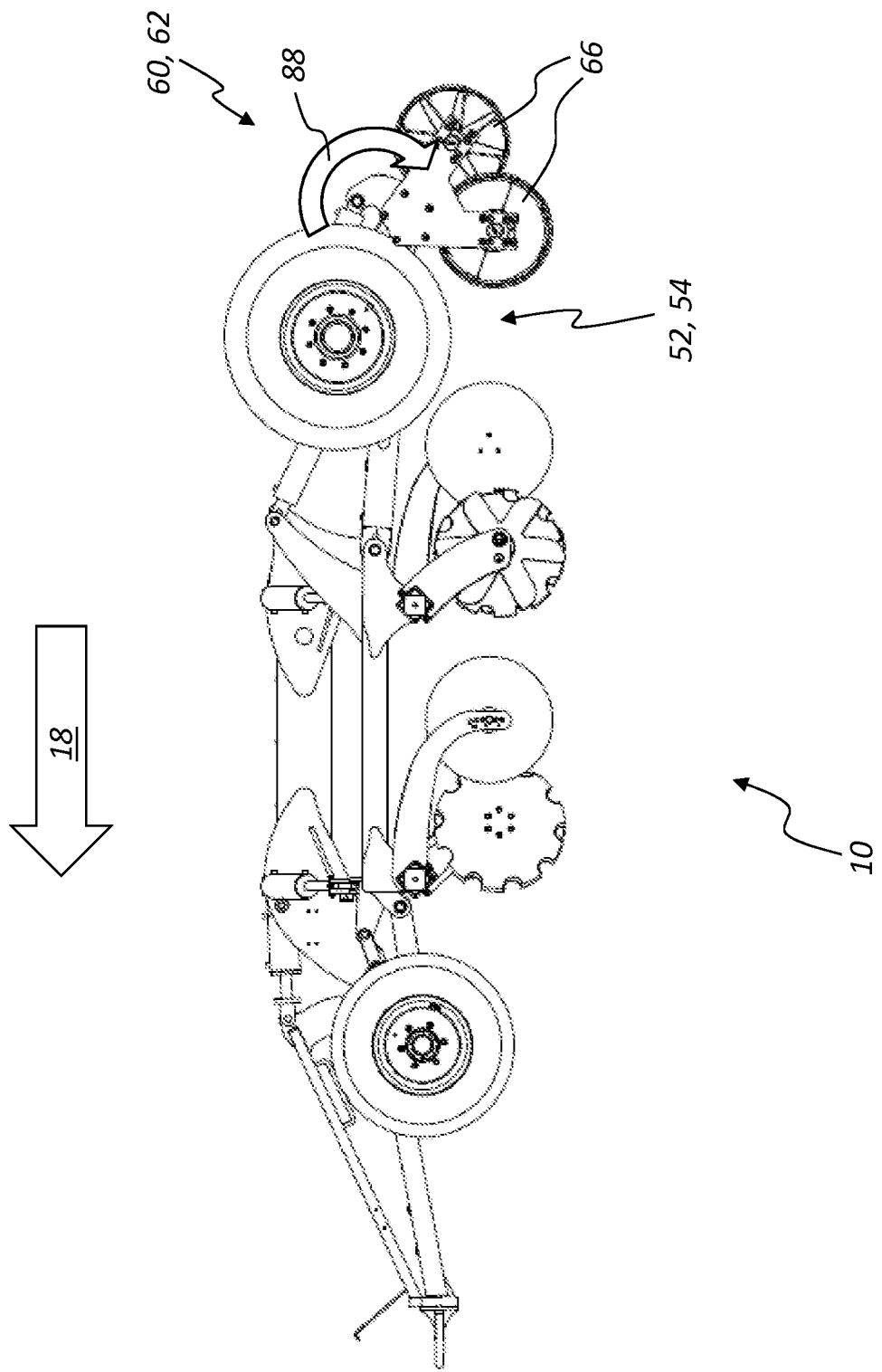

The FIGS. 3a and 3b illustrate the proceeding pivoting movement of the rear module 60 of the machine 10 about the cross tube 70, which proceeding pivoting movement is effected by further compressing the two hydraulic cylinders 74 of the second adjustment device 68. In this process, the upper cantilever 76, which is fixedly anchored to the packer frame 28 and used for linking the respective hydraulic cylinder 74, remains rigid, while the lower linkage 78 turns the cantilever arm 80 of the module frame 72 (cf FIG. 1b and FIG. 1d) with the rear support wheel 54 journaled thereon upward in the direction of the arrow 88 (cf FIG. 3a). The rear support wheels 54 of the running gear 52 of the machine 10 are already lifted off the ground by a considerable distance and pivoted upward in this illustration, while the foremost of the two packer rollers 66 is already supported on the ground. The second stop position E2, however, is still not reached yet.

Figure 4B:
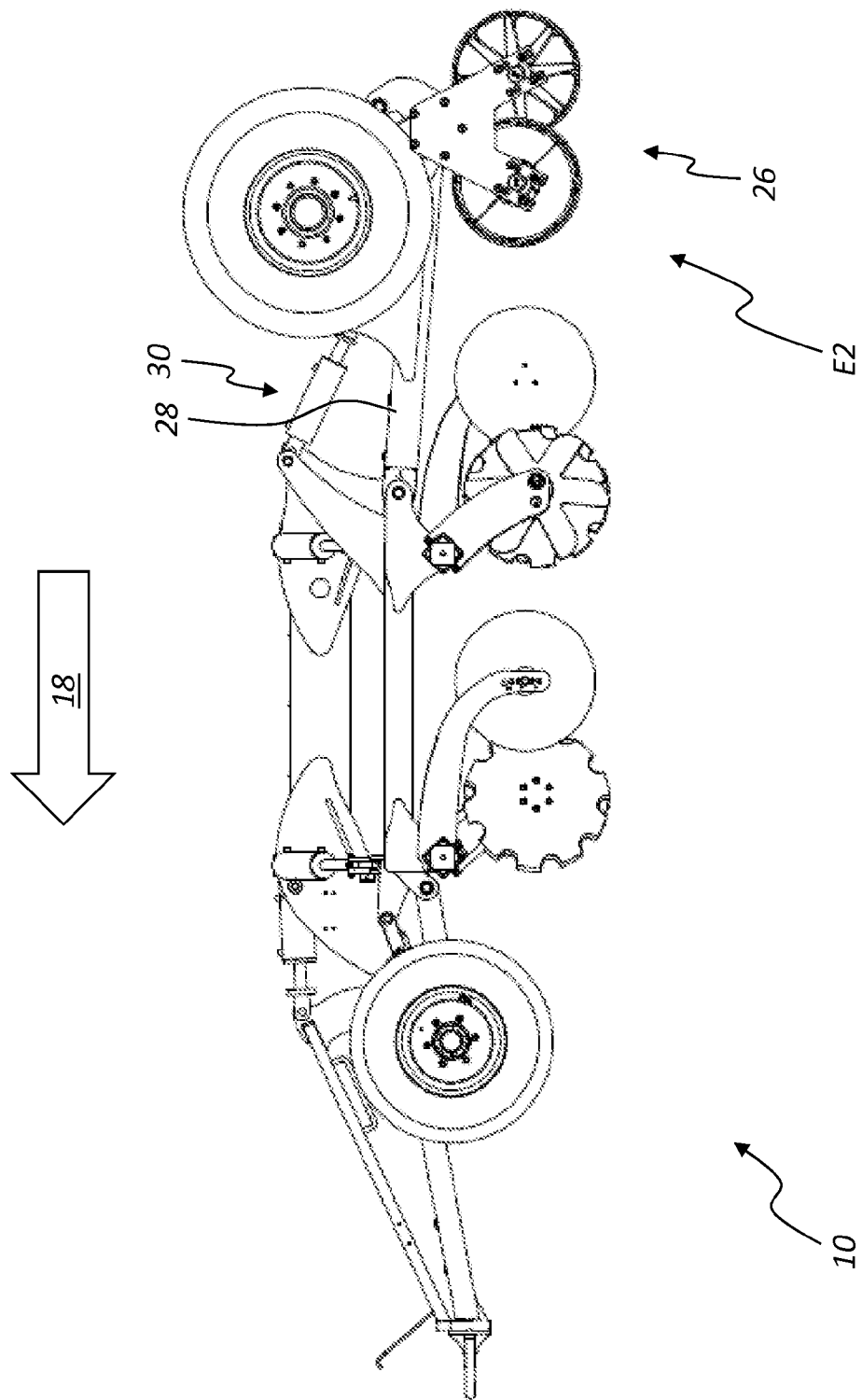
Figure 4C:
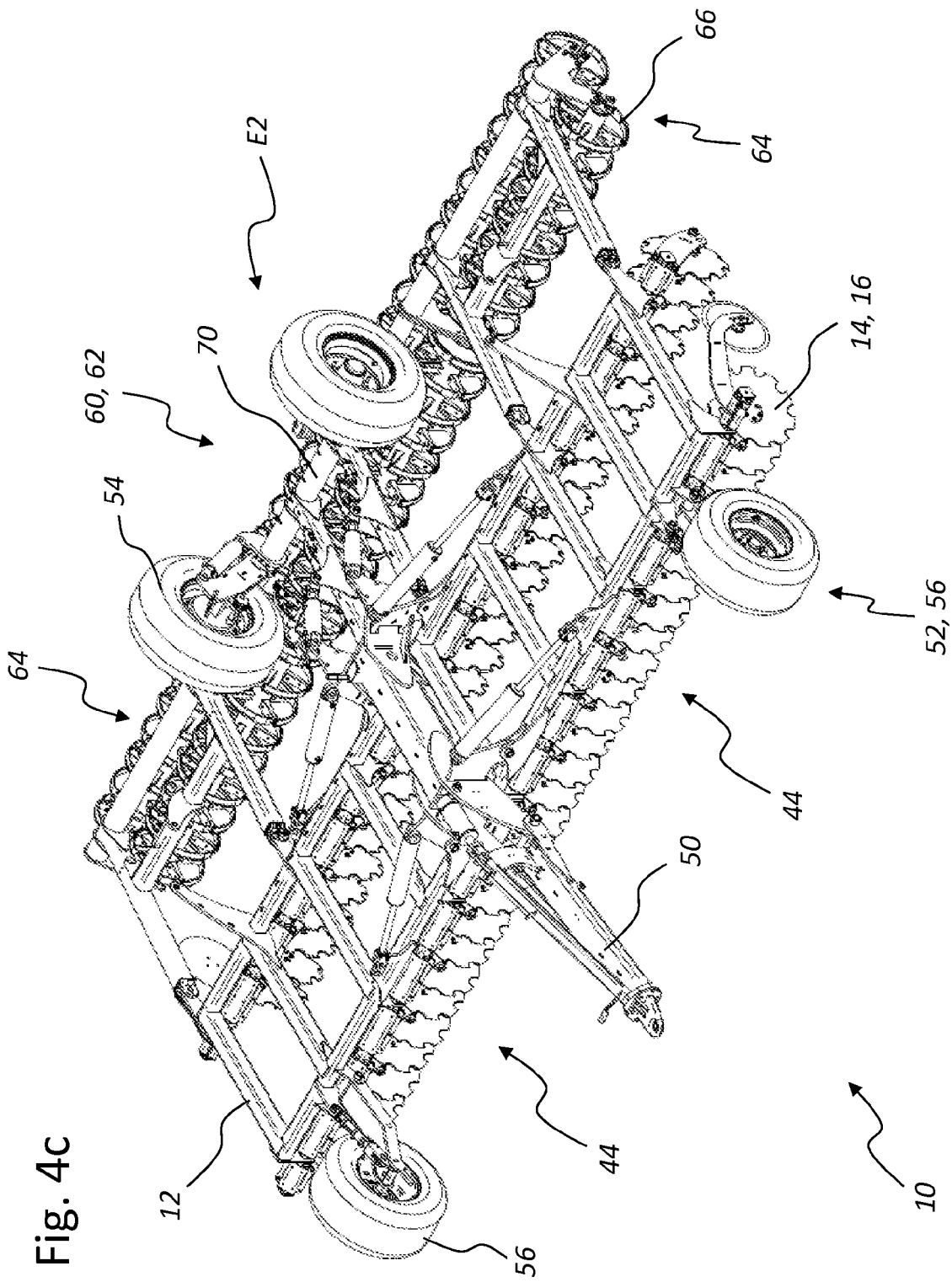

The FIGS. 4a to 4c illustrate the second stop position E2 of the machine 10 with the two hydraulic cylinders 74 of the second adjustment device 68 being fully compressed. The lower linkage 78 with the cantilever arm 80 of the module frame 72 together with the rear support wheel 54 journaled thereon is thereby turned upward (cf FIG. 4a, FIG. 4b). The rear support wheels 54 of the running gear 52 of the machine 10 are thus pivoted fully upward and are located above the packer frame 28, while the two packer rollers 66 are positioned in parallel to each other resting on the ground, thereby constituting the second stop position E2.

In all of the operating modes of the machine 10 between the first stop position E1 and the second stop position E2 as shown in the FIGS. 1 to 4, the packer frame 28 retains its full adjustability and the rear packer unit 26 thus retains its full height adjustability so that the first adjustment device 30 enables adjusting the height of the entire rear packer unit 26 independently from the respectively active operating position or stop position E1 or E2 set by means of the second adjustment device 68.

Figure 5A:
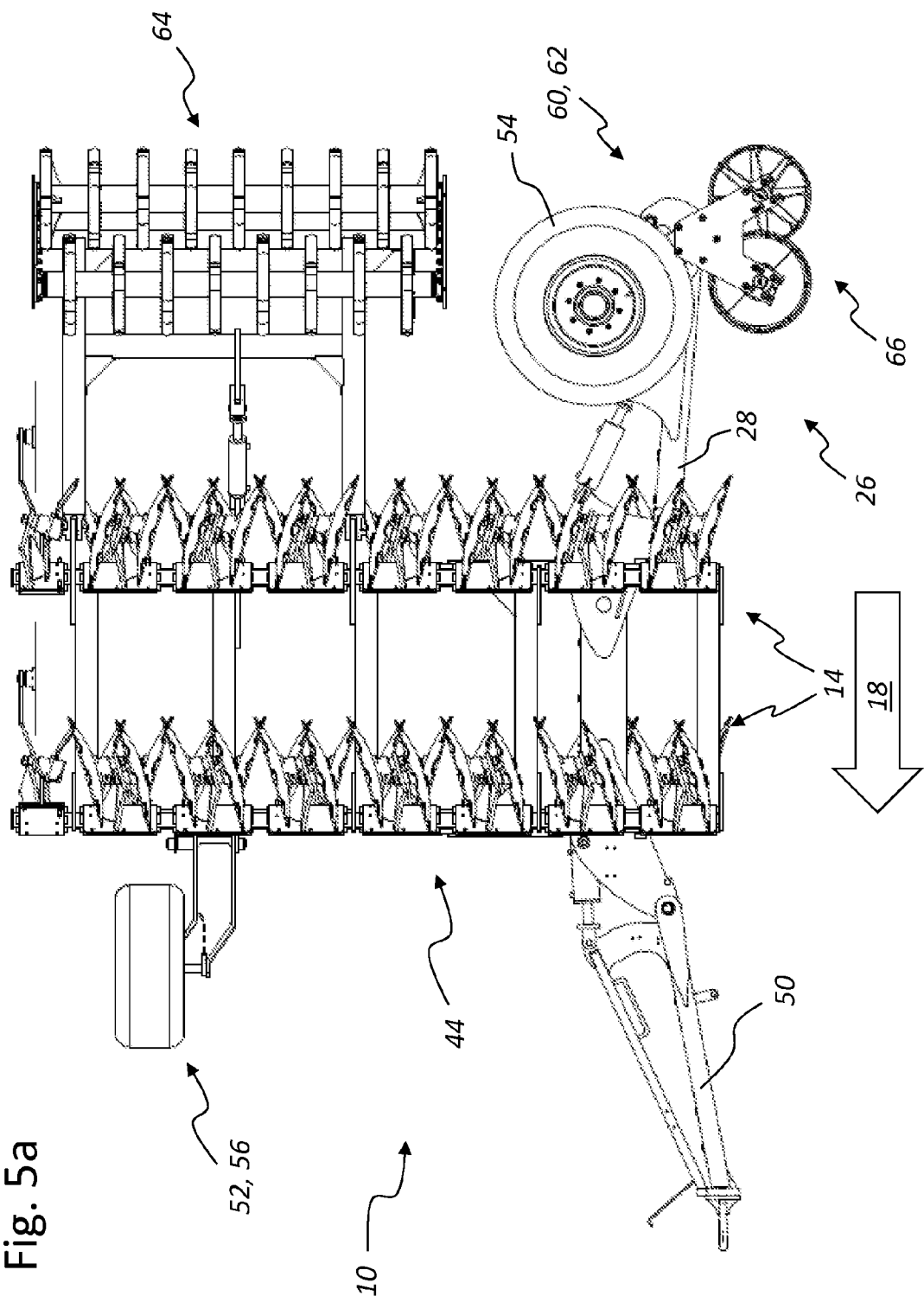
FIGS. 5a 5b, 5c, and 5d show the tilling machine according to FIG. 1 in four different views wherein the machine width is reduced to be suited for road traffic by foldable machine sections with packer segments and tillage tools that are each pivoted vertically upward and brought out of contact range with the ground.

The schematic lateral views in FIGS. 5a to 5d show the machine 10 as it has to be configured for driving on the road for any kind of transport purposes. In these illustrations, the two frame wings 44, which are pivotally journaled on the left and right sides at the lower mounting holes 46 of the mounting plates 42 of the central frame tube 40 (cf the details in FIG. 1c and FIG. 1d), have been pivoted vertically upward by means of the compressed adjuster cylinders 48, thereby making it possible to keep the width of the machine 10 below 3 meters, as is required for transport purposes on public roads. Since the two left and right outer packer segments 64 are not connected to the middle packer segment 62, but rather coupled to the frame wings 44, these packer segments 64 are also pivoted vertically upward together with the frame wings 44, as is shown in the FIGS. 5a to 5d. Here, the two outer packer segments 64 are in a vertical position and in parallel to each other and located above the middle packer segment 62 and the module 60 with the rear part of the running gear 52, which is formed by the rear support wheels 54. The FIG. 5a illustrates a position of the module 60 that corresponds to the second stop position E2 with the packer rollers 66 resting on the ground and the rear support wheels 54 completely lifted off the ground. However, as the machine cannot be reasonably operated in this position due to the raised tillage tools 14 or the raised disks 16, as the case may be, the second operating position E2 is not indicated in this figure.

Although the upwardly pivoted frame wings 44 and the lateral packer segments 64 do not allow operating the machine 10 on the field, the FIGS. 5a to 5d nevertheless serve to illustrate a return pivoting movement of the module 60 for returning from the second operating position E2 to the first operating position E1.

Figure 5B:
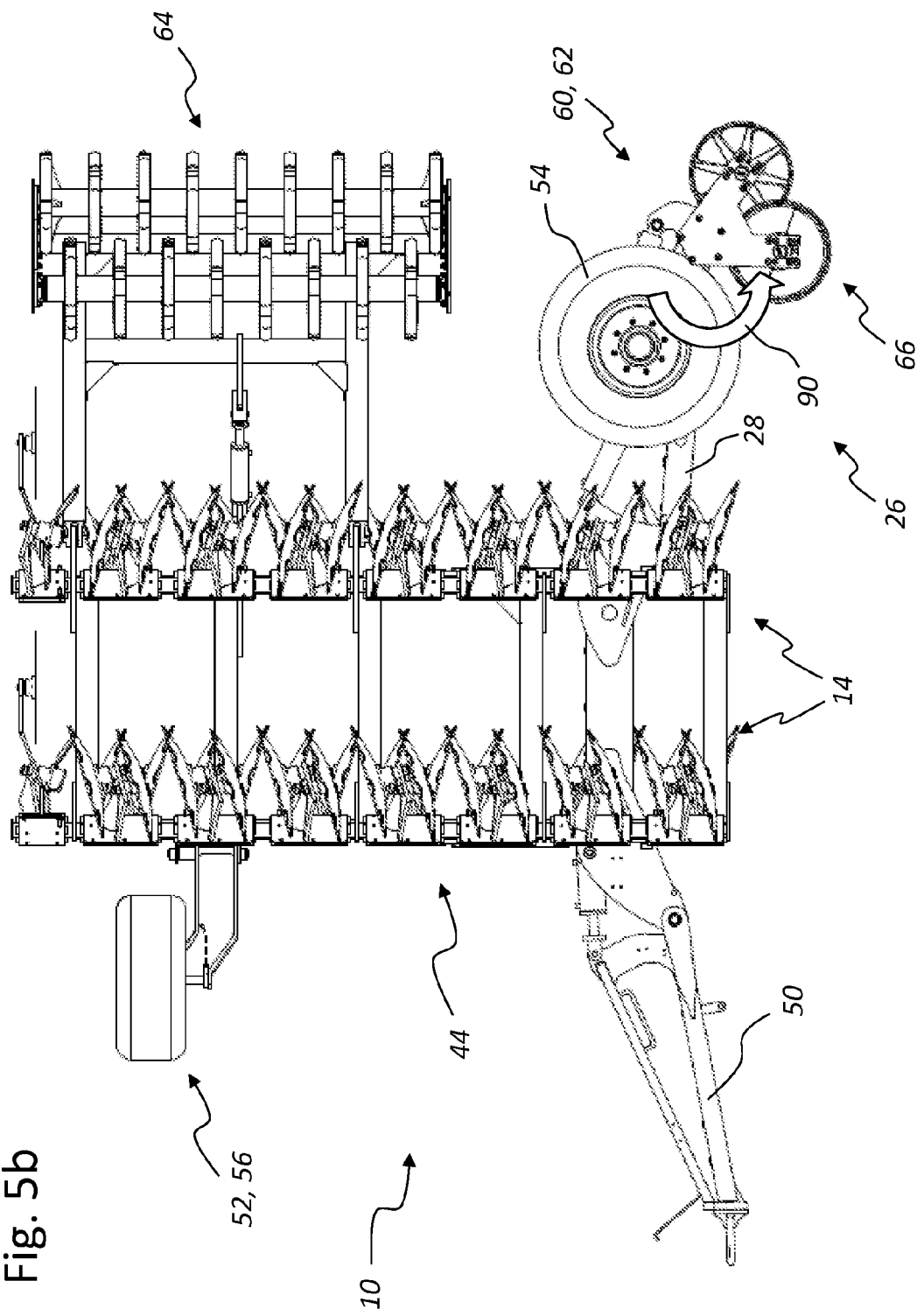

The FIG. 5b illustrates the return pivoting movement of the rear module 60 of the machine 10 about the cross tube 70, which return pivoting movement is effected by extending the two hydraulic cylinders 74 of the second adjustment device 68. In this process, the upper cantilever 76, which is fixedly anchored to the packer frame 28 and used for linking the respective hydraulic cylinder 74, remains rigid, while the lower linkage 78 turns the cantilever arm 80 of the module frame 72 (cf FIG. 1b and FIG. 1d) with the rear support wheel 54 journaled thereon downward in the direction of the arrow

90 (cf FIG. 5*b*). The rear support wheels 54 of the running gear 52 of the machine 10 are already slightly lowered down in the illustration of FIG. 5*b*, while the rearmost of the two packer rollers 66 is already lifted off the ground. As the running gear 52 is still out of function, at least in the rear end of the machine 10, by the rear support wheels 54 still being in a position raised above the ground, the first stop position E1 is not reached yet.

Figure 5C:
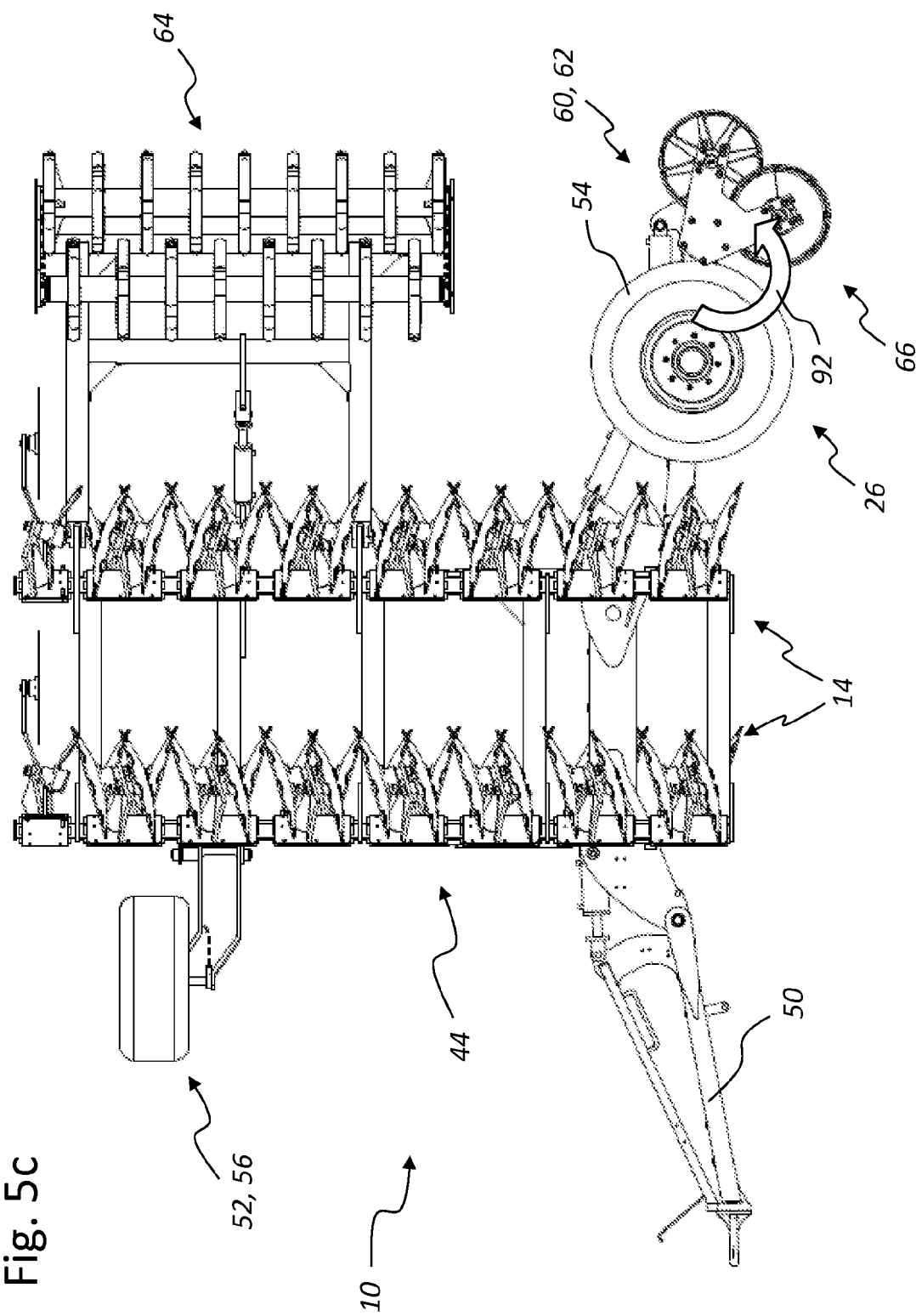

The FIG. 5*c* illustrates the return pivoting movement of the rear module 60 of the machine 10 about the cross tube 70, which return pivoting movement is effected by extending the two hydraulic cylinders 74 of the second adjustment device 68. In this process, the upper cantilever 76, which is fixedly anchored to the packer frame 28 and used for linking the respective hydraulic cylinder 74, remains rigid, while the lower linkage 78 turns the cantilever arm 80 of the module frame 72 (cf FIG. 1*b* and FIG. 1*d*) with the rear support wheel 54 journaled thereon downward in the direction of the arrow 90 (cf FIG. 5*b*). The rear support wheels 54 of the running gear 52 of the machine 10 are already slightly lowered down in the illustration of FIG. 5*b*, while the rearmost of the two packer rollers 66 is already lifted off the ground. As the running gear 52 is still out of function, at least in the rear end of the machine 10, by the rear support wheels 54 still being in a position raised above the ground, the first stop position E1 is not reached yet.

The FIG. 5*c* illustrates the proceeding return pivoting movement of the rear module 60 of the machine 10 about the cross tube 70, which proceeding return pivoting movement is effected by further extending the two hydraulic cylinders 74 of the second adjustment device 68. At the same time, the rear support wheel 54 continues to pivot downward in the direction of the arrow 92 (cf FIG. 5*c*). The rear support wheels 54 of the running gear 52 of the machine 10 are thus further lowered according to FIG. 5*c*, while the foremost of the two packer rollers 66 is now gradually lifted off the ground, as well. As the running gear 52 is still out of function, at least in the rear end of the machine 10, by the rear support wheels 54 still being in a position raised above the ground, the first stop position E1 is not reached yet.

Figure 5D:
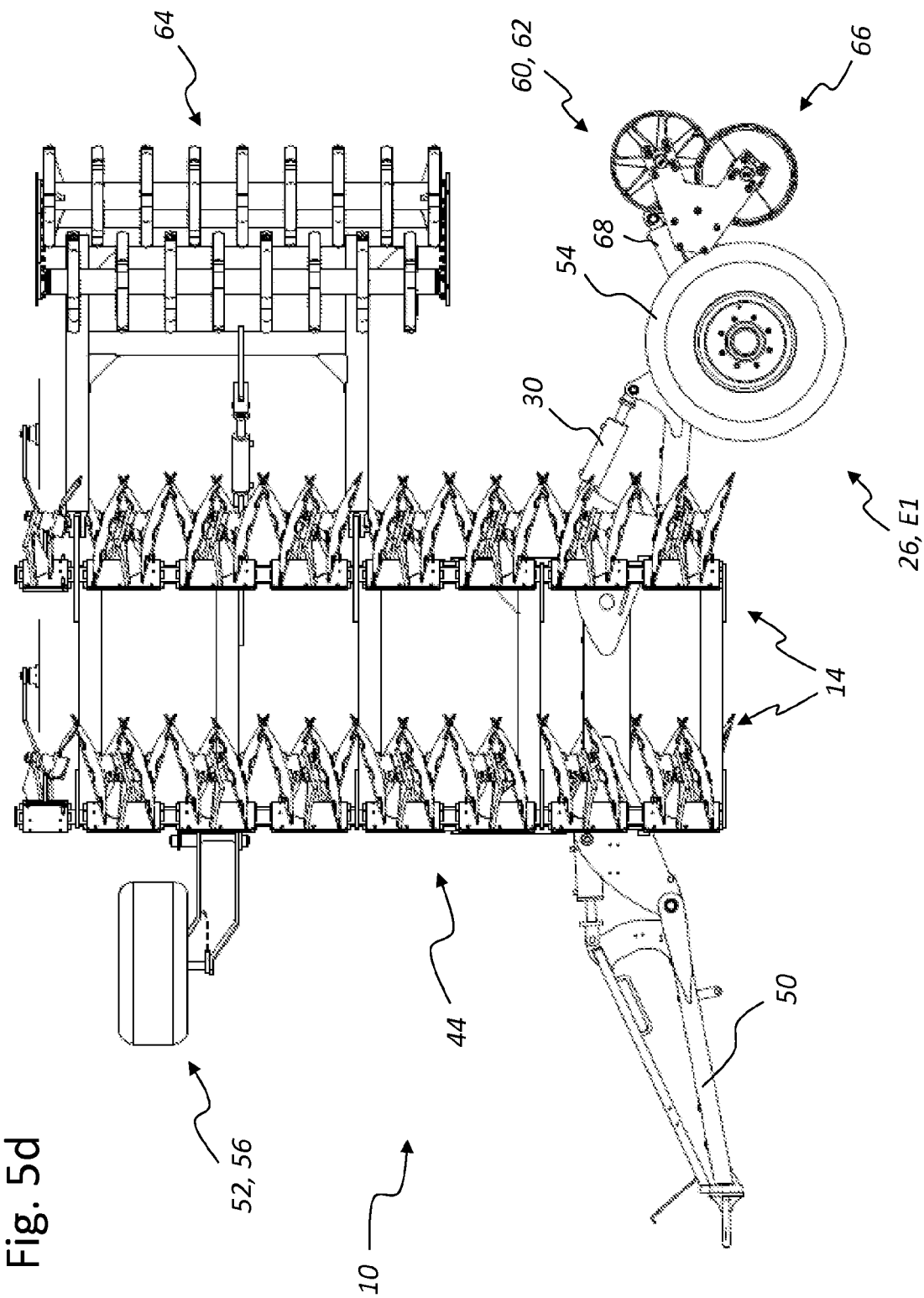

In the arrangement shown in FIG. 5*d*, this first stop position E1 is reached and set, so that the accordingly configured machine 10 can be driven on the road without any problems with its frame parts 44 and 64 (including the optional front support wheels 56) pivoted upward and the rear support wheels 54 of the running gear 52 rolling on the ground. For this purpose, the machine 10 is connected to a towing vehicle by means of the drawbar 50. The packer tools 66 are lifted off the ground to prevent any unintentional contact with the road. The packer frame 28 is adjusted in its height according to the required purpose, which height adjustment may also be effected while driving on the road by means of the first adjustment device 30.

The invention has been described with reference to a preferred embodiment. Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

LIST OF REFERENCE CHARACTERS

10 Machine, tillage equipment, tilling combination
12 Frame, machine frame
14 Tillage tools
16 Disks
18 Driving direction
20 Axis, rotation axis
22 Middle section
24 Working range, tillage range
26 Packer unit
28 Packer frame
30 First adjustment device
32 Mounting, mounting means
34 Hydraulic cylinder
36 Frame side linkage
38 Top side linkage
40 Frame tube, square frame tube
42 Mounting plate
44 Frame wing
46 Lower mounting hole
48 Adjuster cylinder
50 Drawbar
51 Drawbar cylinder
52 Running gear
54 Rear support wheels
56 Front support wheels
58 Height adjustment means
60 Module, functional unit
62 Middle packer segment
64 Outer packer segment
66 Packer rollers, packer tools
68 Second adjustment device
70 Cross tube, swivel axis, pivot point
72 Module frame
74 Hydraulic cylinder
76 Cantilever
78 Linkage
80 First cantilever arm
82 Second cantilever arm, cantilever arm pair
84 Packer shaft
86 Direction of rotation (module) to second stop position
88 Direction of rotation (module) to second stop position
90 Direction of return rotation (module) to first stop position
92 Direction of return rotation (module) to first stop position
E1 First stop position
E2 Second stop position

What is claimed is:

1. A towed agricultural machine for tilling or for sowing seeds, the machine comprising a machine frame and tillage tools arranged thereon, and further comprising a packer unit arranged subsequent to the tillage tools in the driving direction of the machine, the machine being characterized in that:
the packer unit, which is pivotally and height adjustably journaled on the machine frame, comprises a module with a running gear as well as packer tools arranged thereon, wherein the module is journaled to be pivotal in relation to the packer unit between two stop positions,
wherein either the running gear or the packer tools face toward the ground or are in contact with the ground in the respective stop positions,
wherein the packer unit is assigned at least one first adjustment device and the module journaled is assigned at least one second adjustment device, wherein the first and second adjustment devices are controllable independently from each other and which are employed for adjusting the packer unit and the module arranged thereon, and
wherein the module comprises a module frame arranged pivotally on the packer frame, with the packer tools and the running gear being rigidly connected to said module frame and wherein the packer tools and the running gear form a rigid unit.

2. The machine as recited in claim 1 wherein the packer unit, hinged onto the machine frame comprises a pivotal and height adjustable packer frame, which is coupled to the machine frame by at least one first adjustment device.

3. The machine as recited in claim 2 wherein the at least one first adjustment device lowers or lifts the packer unit as a whole, said packer unit being hinged on the machine frame and movable about an approximately horizontal swivel axis.

4. The machine as recited in claim 3 wherein the stop positions of the module are defined by a pivoting movement around an approximately horizontally positioned cross tube, and wherein the stop positions are controllable by adjustment movements of at least one second adjustment device.

5. The machine as recited in claim 4 wherein the module comprises one or more cantilever arms for the running gear or for the packer unit arranged on the cross tube, wherein the module comprising the cross tube and the one or more cantilever arms is in itself formed to be rigid.

6. The machine as recited in claim 5 wherein a first and a second operating positions of the machine are each assigned to one of the stop positions of the pivoting range of the cross tube with the one or more cantilever arms for the running gear or the packer unit arranged thereon.

7. The machine as recited in claim 6 wherein the module further comprises at least two outer packer segments arranged on either side of the module, and wherein the running gear serves for transport purposes in the first operating position.

8. A method for the conversion of a towed agricultural machine, the conversion being effected between a first operating mode for tilling or for sowing seeds and a second operating mode for road traffic, wherein the machine comprises a machine frame and tillage tools arranged thereon and further a packer unit arranged subsequent to the tillage tools in the driving direction of the machine, the packer unit being hinged pivotally and height adjustably on the machine frame, and the packer unit being assigned a running gear comprising at least two rear support wheels, which are arranged in the area of the rear end of the machine, wherein the packer unit is pivotally and height adjustably journaled on the machine frame and comprises a module with the running gear as well as packer tools rigidly arranged thereon, wherein the module is journaled to be pivotal between two stop positions, wherein either the running gear or the packer tools face toward the ground or are in contact with the ground in the respective stop positions, wherein the packer unit together with the module journaled thereon are height adjustable or pivotal in relation to the machine frame by a first adjustment device, and wherein the packer tools and the running gear form a rigid unit, the method comprising:

switching the module between its two stop positions for driving on the road and for driving on the field by at least one second adjustment device, wherein an adjustment or a pivoting movement of the module arranged pivotally on the packer frame around an approximately horizontally positioned swivel axis defines the stop positions of said module, and wherein the stop positions are controllable by adjustment movements of the second adjustment device that is hinged onto the packer frame.

9. The method as recited in claim 8 wherein the at least one first adjustment device lowers or lifts the packer unit as a whole, said packer unit being hinged on the machine frame and movable about an approximately horizontal swivel axis.

10. The method as recited in claim 9 wherein, in a first operating position, the running gear or the rear support wheels arranged at the rear end of the machine are brought into an active position for road traffic and the packer unit is brought outside the engagement range with the ground, and wherein, in a second operating position, the running gear, or at least parts of the running gear, are brought into an inactive position out of contact range with the ground and the packer unit is in an active mode in engagement with the ground.

11. The method as recited in claim 10 wherein, in the first operating position, the running gear or the rear support wheels arranged at the rear end of the machine are brought into an active position for road traffic and the packer tools are brought outside the engagement range with the ground, and wherein, in the second operating position, the running gear, or at least parts of the running gear, are brought into an inactive position out of contact range with the ground and the packer tools are in an active mode in engagement with the ground.

* * * * *